(12) United States Patent
Siomina et al.

(10) Patent No.: US 8,995,393 B2
(45) Date of Patent: Mar. 31, 2015

(54) METHODS AND NETWORK NODES FOR SIGNALLING OF COMPLEMENTARY ASSISTANCE DATA

(75) Inventors: Iana Siomina, Solna (SE); Muhammad Kazmi, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 573 days.

(21) Appl. No.: 13/263,395

(22) PCT Filed: Sep. 9, 2011

(86) PCT No.: PCT/SE2011/051096
§ 371 (c)(1),
(2), (4) Date: Oct. 7, 2011

(87) PCT Pub. No.: WO2012/096608
PCT Pub. Date: Jul. 19, 2012

(65) Prior Publication Data
US 2013/0064219 A1    Mar. 14, 2013

Related U.S. Application Data

(60) Provisional application No. 61/431,941, filed on Jan. 12, 2011.

(51) Int. Cl.
*H04W 4/00* (2009.01)
*H04W 64/00* (2009.01)
(Continued)

(52) U.S. Cl.
CPC ............. *H04W 64/00* (2013.01); *G01S 5/0236* (2013.01); *H04W 36/08* (2013.01)
USPC ...... 370/331; 370/395.21; 370/401; 455/437; 455/438; 455/440; 455/442

(58) Field of Classification Search
CPC ............. H04B 7/1853; H04B 7/18541; H04B 7/18545; H04B 7/18547; H04B 7/18554; H04W 36/0016; H04W 36/022; H04W 36/0061; H04W 36/0066; H04W 36/0072; H04W 36/0077; H04W 36/083; H04W 36/0088; H04W 36/0094; H04W 36/165; H04W 36/18; H04W 36/22; H04W 36/36; H04W 36/38; H04W 36/385
USPC ............. 370/331, 395.21, 401; 455/437, 438, 455/439, 440, 442
See application file for complete search history.

(56) References Cited

U.S. PATENT DOCUMENTS 6,064,885 A *   5/2000  Rouhollahzadeh et al. .. 455/439
6,973,303 B1*  12/2005  Meidan ........................ 455/421

(Continued)

OTHER PUBLICATIONS

International Search Report issued in corresponding International Application No. PCT/SE2011/051096, mailed Feb. 28, 2012.
(Continued)

*Primary Examiner* — Alvin Zhu
(74) *Attorney, Agent, or Firm* — Patent Portfolio Builders PLLC

(57) ABSTRACT

A positioning node (110), a user equipment (120), a radio network node (130) and methods therein for providing complementary assistance data to be used by a user equipment (120) during a positioning session for determining a position of the user equipment (120) and for enabling continuation of the positioning session are provided. A change from a first cell to a second cell occurs during the positioning session. The user equipment (120) receives control information from the first cell before the change and from the second cell after the change. The positioning node obtains information identifying the second cell. Next, the positioning node generates the complementary assistance data relating to the second cell in advance of the change. The complementary assistance data comprises assistance data adapted to the second cell when the second cell is configured to provide control information to the user equipment (120). The positioning node sends the complementary assistance data relating to the second cell to the user equipment (120) via the radio network node (130) in advance of the change. Next, the user equipment (120) processes the complementary assistance data, thereby enabling continuation of the positioning session.

47 Claims, 10 Drawing Sheets

(51) Int. Cl.
*G01S 5/02* (2010.01)
*H04W 36/08* (2009.01)

(56) References Cited

U.S. PATENT DOCUMENTS

| | | | |
|---|---|---|---|
| 2003/0040331 A1* | 2/2003 | Zhao | 455/552 |
| 2004/0246923 A1 | 12/2004 | Achard | |
| 2007/0257838 A1* | 11/2007 | Cheng | 342/357.15 |
| 2011/0028150 A1* | 2/2011 | Kone | 455/436 |
| 2011/0250887 A1* | 10/2011 | Tenny | 455/436 |
| 2012/0142328 A1* | 6/2012 | Awoniyi et al. | 455/418 |
| 2013/0203419 A1* | 8/2013 | Siomina et al. | 455/437 |

OTHER PUBLICATIONS

Written Opinion issued in corresponding International Application No. PCT/SE2011/051096, mailed Feb. 28, 2012.

ZTE: "Discussion on UE Positioning in Handover", 3GPP Draft; R2-094728, 3rd Generation Partnership Project (3GPP), Mobile Competence Centre; 650, Route Des Lucioles; F-06921 Sophia-Antipolis Cedex; France, No. Shenzhen, China; Aug. 24-28, 2009, Aug. 18, 2009; XP050352781, entire document.

QUALCOMM Europe: "Continuity at Handover for OTDOA", 3GPP Draft; R2-096966, 3rd Generation Partnership Project (3GPP), Mobile Competence Centre; 650, Route Des Lucioles; F-06921 Sophia-Antipolis Cedex; France, No. Jeju, Korea; Nov. 9-13, 2009, Nov. 9, 2009; XP050391343, p. 3, lines 1-11.

* cited by examiner

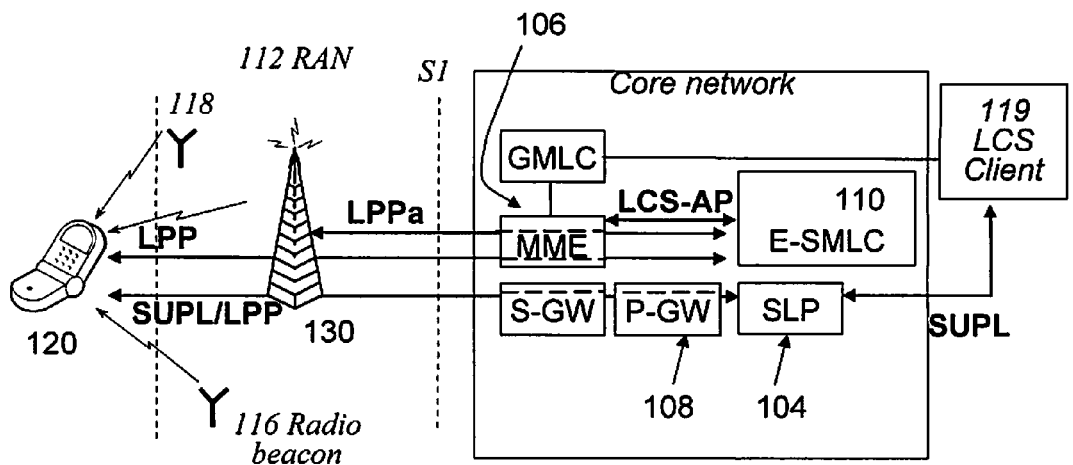
Fig. 7
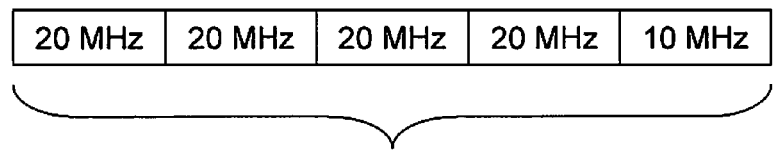
Fig. 8    Aggregated bandwidth of 90 MHz
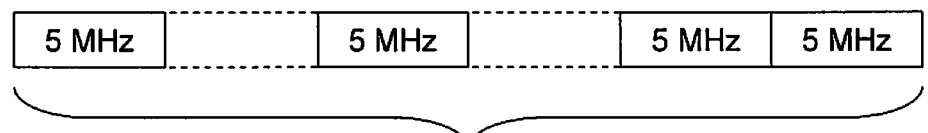
Fig. 9    Aggregated bandwidth of 20 MHz

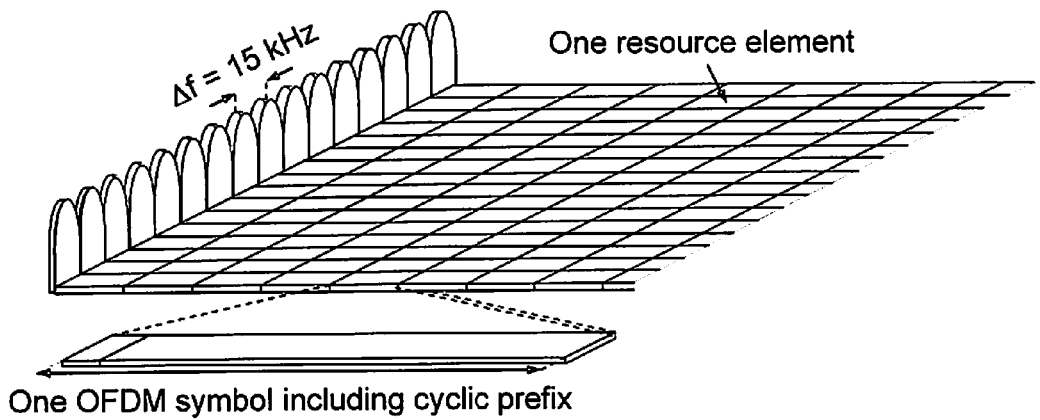
One OFDM symbol including cyclic prefix
Fig. 10
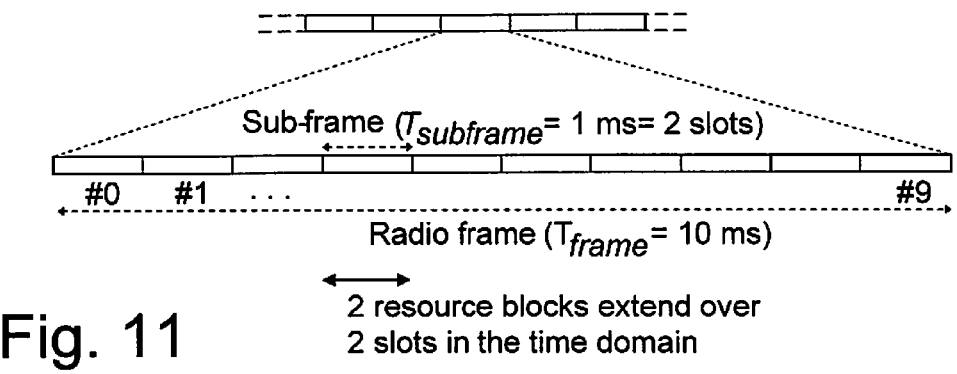
Fig. 11  2 resource blocks extend over 2 slots in the time domain

METHODS AND NETWORK NODES FOR SIGNALLING OF COMPLEMENTARY ASSISTANCE DATA

TECHNICAL FIELD

The present disclosure relates generally to telecommunications systems, and in particular, to methods, systems, devices and software associated with wireless communications networks capable of providing assistance data to facilitate measurements performed by a wireless device. More particularly, the present disclosure relates to a positioning node and a method in a positioning node for providing complementary assistance data, a user equipment and a method in a user equipment for enabling continuation of a positioning session with a positioning node, a radio network node and a method in a radio network node for providing complementary assistance data to be used by a user equipment.

BACKGROUND

Radio communication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radio communication applications, while at the same time using legacy infrastructure, network operators could deploy hybrid networks wherein a next generation radio communication system is overlaid onto an existing circuit-switched or packet-switched network as a first step in the transition to an all IP-based network. Alternatively, a radio communication system can evolve from one generation to the next while still providing backward compatibility for legacy equipment.

One example of such an evolved network is based upon the Universal Mobile Telephone System (UMTS) which is an existing third generation (3G) radio communication system that is evolving into High Speed Packet Access (HSPA) technology. Yet another alternative is the introduction of a new radio access technology, e.g., the so-called Long Term Evolution (LTE) technology. Each new generation, or partial generation, of mobile communication systems provide enhanced performance but typically also add complexity and abilities to mobile communication systems and this can be expected to continue with either enhancements to proposed systems or completely new systems in the future. An example of such added ability is identification of a user's geographical location, aka user geographical location, using proactive assistance data.

The possibility of identifying user geographical location in networks has enabled a large variety of commercial and non-commercial services. Examples of such services are navigation assistance, social networking, location-aware advertising, emergency calls, positioning services etc. Different services may have different positioning accuracy requirements imposed by the application. In addition, some regulatory requirements on the positioning accuracy for basic emergency services exist in some countries, i.e. Federal Communications Commission (FCC) E911 in US.

In many environments, the position of a user or user terminal, also referred to herein as "user equipment" or UE, can be accurately estimated by using positioning methods based on GPS (Global Positioning System). Nowadays networks have also often a possibility to assist UEs in order to improve the terminal receiver sensitivity and GPS start-up performance (Assisted-GPS positioning, or A-GPS). GPS or A-GPS receivers, however, may be not necessarily available in all wireless terminals. Furthermore, GPS is known to often fail in indoor environments and urban canyons. A complementary terrestrial positioning method, called Observed Time Difference of Arrival (OTDOA), has therefore been standardized by Third Generation Partnership Project (3GPP). In addition to OTDOA, the LTE standard also specifies methods, procedures and signaling support for Enhanced Cell ID (E-CID), Advanced Global Navigation Satellite System (A-GNSS) and Uplink-Time Difference Of Arrival (UTDOA).

There are three significant network elements in an LTE positioning architecture, namely a location service (LCS) Client, an LCS target and an LCS Server. The LCS Server is a physical or logical entity managing positioning for the LCS target by collecting measurements and other location information, assisting the user equipment in measurements when necessary, and estimating the LCS target location. The LCS Client is a software and/or hardware entity that interacts with the LCS Server for the purpose of obtaining location information for one or more LCS targets, i.e. the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal or the network. A positioning session is initiated by the positioning request and is typically finalized when the positioning result, such as a position given by a set of coordinates, is delivered to the LCS Client.

Position calculation can be conducted, for example, by a positioning server, such as an Enhanced Serving Mobile Location Center (Enhanced SMLC or E-SMLC), a Secure User Plane Location (SUPL) Location Platform (SLP) in LTE or a UE. The former approach corresponds to the UE-assisted positioning mode, whilst the latter corresponds to the UE-based positioning mode. Two positioning protocols operating via the radio network exist in LTE, LTE Positioning Protocol (LPP) and LPP Annex (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between evolved-NodeB (eNodeB) and LCS Server specified only for control-plane positioning procedures, although it still can assist user-plane positioning by querying eNodeBs for information and eNodeB measurements. SUPL protocol is used as a transport for LPP in the user plane.

To enable positioning in LTE and facilitate positioning measurements of a proper quality and for a sufficient number of distinct locations, new physical signals dedicated for positioning have been introduced and low-interference positioning subframes have been specified in 3GPP. The new physical signals dedicated for positioning are referred to as positioning reference signals (PRS), although using other physical signals for positioning is not precluded. The PRS are transmitted from one antenna port (R6) according to a pre-defined pattern which is described in the standards document 3GPP TS 36.211. A frequency shift, which is a function of Physical Cell Identity (PCI), can be applied to the specified PRS patterns to generate orthogonal patterns and modeling the effective frequency reuse of six, which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g. cell-specific reference signals (CRS), could in principle also be used for positioning measurements.

PRS are transmitted in pre-defined positioning subframes grouped by several consecutive subframes ($N_{PRS}$), i.e. one positioning occasion. Positioning occasions occur periodically with a certain periodicity of N subframes, i.e. the time interval between two closest positioning occasions. The standardized periods N are 160, 320, 640, and 1280 ms, and the number of consecutive subframes may be 1, 2, 4, or 6 as described in 3GPP TS 36.211.

Assistance data is intended to assist a wireless device, such as a user equipment, in its positioning measurements. Hereinafter, assistance data may be referred to as positioning assistance data. Different sets of positioning assistance data is typically used for different positioning methods. The positioning assistance data is typically sent by the positioning server, although it may be sent via other nodes. For example, the positioning assistance data may be sent to an eNodeB for being further sent to the UE, e.g. transparently to eNodeB and also Mobility Management Entity (MME). The assistance data may also be sent by the eNodeB via LPPa to positioning server for further transfer to the UE.

The assistance data may be sent on a request from the wireless device that will perform measurements or in an unsolicited way. In LTE, the assistance data may be provided and requested over the LPP protocol by including provideAssistanceData and requestAssistanceData elements in the LPP message, respectively. The current LTE standard specifies the following structure for provideAssistanceData:

```
ProvideAssistanceData-r9-IEs ::= SEQUENCE {
    commonIEsProvideAssistanceData    CommonIEsProvideAssistanceData
OPTIONAL,       -- Need ON
    a-gnss-ProvideAssistanceData      A-GNSS-ProvideAssistanceData
OPTIONAL,       -- Need ON
    otdoa-ProvideAssistanceData               OTDOA-
ProvideAssistanceData         OPTIONAL,  -- Need ON
    epdu-Provide-Assistance-Data      EPDU-Sequence
            OPTIONAL,  -- Need ON
    ...
}
``` where the commonIEsProvideAssistanceData IE is provided for future extensibility only and not used so far. The LTE assistance data may thus be provided for A-GNSS and OTDOA. The External Protocol Data Unit Sequence (EPDU-Sequence) contains information elements (IEs) that are defined externally to LPP by other organizations, which currently may only be used for Open Mobile Alliance (OMA) LPP extensions (LPPe).

A similar structure exists for requestAssistanceData:

```
RequestAssistanceData-r9-IEs ::= SEQUENCE {
    commonIEsRequestAssistanceData       CommonIEsRequestAssistanceData
    OPTIONAL,  -- Need ON
    a-gnss-RequestAssistanceData         A-GNSS-RequestAssistanceData  OPTIONAL,
    -- Need ON
    otdoa-RequestAssistanceData          OTDOA-RequestAssistanceData
    OPTIONAL,  -- Need ON
    epdu-RequestAssistanceData           EPDU-Sequence                 OPTIONAL,
    -- Need ON
    ...
}
``` where commonIEsRequestAssistanceData may optionally carry the serving cell ID (ECGI).

Since for OTDOA positioning PRS signals from multiple distinct locations need to be measured, the UE receiver may have to deal with PRS that are much weaker than those received from the serving cell. Furthermore, without the approximate knowledge of when the measured signals are expected to arrive in time and what is the exact PRS pattern, the UE would need to do signal search within a large window which would impact the time and accuracy of the measurements as well as the UE complexity. To facilitate UE measurements, the network transmits assistance data to the UE, which includes, among others, reference cell information, neighbor cell list containing PCIs of neighbor cells, the number of consecutive downlink subframes, PRS transmission bandwidth, frequency, etc.

Assistance data delivery is currently not required for UE- or eNodeB-assisted forms of E-CID positioning, but it may be transmitted by using EPDU elements. UE-based E-CID location is not supported in this version of the specification, and the assistance data delivery procedure is not applicable to uplink E-CID positioning.

With OMA, the assistance data are enhanced with the possibility to assist a larger range of positioning methods. E.g. assistance data may also be provided for E-CID or other methods of other Radio Access Technology (RATs), e.g. OTDOA UMTS Terrestrial Radio Access (UTRA) or E-OTD Global System for Mobile Communications (GSM), or other Public Land Mobile Network (PLMN) networks.

A multi-carrier system, herein interchangeably called carrier aggregation (CA), allows the UE to simultaneously receive and/or transmit data over more than one carrier frequency, where each of the carrier frequencies is often referred to as a component carrier (CC). One of the CC is the primary carrier, which is also interchangeably called the anchor carrier or even primary component carrier (PCC). The remaining ones are called the secondary or supplementary carriers or even secondary component carrier (SCC). The cells in the serving sector are called serving cells. More specifically, the serving cells may be a primary serving cell (PCell) and one or more secondary serving cell(s) (SCells). The PCell is on the primary CC (PCC), and SCells are on the secondary CCs (SCCs). The primary carrier carries all common and UE-specific control channels. The secondary carrier may contain only the minimum necessary signaling information and signals, typically cell-specific, e.g. those signals or channels that are UE-specific may be not present in the secondary carrier. The configured primary cells/primary carrier and the set of secondary cells/secondary carriers are typically UE specific, and may also be activated or deactivated. The multi-carrier concept is used in both HSPA and LTE.

The same is true for the uplink primary carriers. For example in a multi-carrier system comprising of 2 DL (F1_DL, F2_DL) and 2 UL carriers (F1_UL, F2_UL), some of the UEs may have F1_DL as the primary carrier and remaining ones may have F2_DL as their primary carrier. The network is able to change the primary carrier of the UE, also referred to as primary carrier switching, at any time. Primary carrier switching is done, for example, to balance the load on different carriers.

In a scenario, where the primary carrier is changed during an ongoing positioning session, a problem may be that performance of the positioning session is degraded in terms of, for example, accuracy and speed.

Another scenario will now be described with reference to a generic telecommunication system. The generic telecommunication system comprises a user equipment, a first and a second cell managed by a radio base station. In other exemplifying scenarios, the first and second cells may be managed by different radio base stations. Firstly, the user equipment is served by the first cell. The user equipment may, as an example, move such that it no longer is within coverage of the first cell. Then, a so called handover from the first cell to the second cell is performed as the user equipment moves into a coverage area of the second cell. In this scenario, a problem may be that when the handover occurs during an ongoing positioning session, performance of the positioning session is degraded in terms of, for example, accuracy and speed.

A high-level positioning architecture, as it is currently standardized in LTE, is illustrated in FIG. 7, where the LCS target is a terminal 120, and the LCS Server is an E-SMLC 102 or an SLP 104. In the figure, the control plane positioning protocols with E-SMLC 102 as the terminating point are shown as the three arrows labeled LCS-AP, LPPa, and LPP, disposed, at least in part, between the E-SMLC 110 and the MME 106, and the user plane positioning protocol is shown by the arrows labeled SUPL/LPP and SUPL. SLP 104 may comprise two components, SPC and SLC, which may also reside in different nodes. In an example implementation, SPC has a proprietary interface with E-SMLC 102, an Llp interface with SLC, and the SLC part of SLP 104 communicates with P-GW (PDN-Gateway) 108 and External LCS Client 119. Also seen in FIG. 7, are the radio access network (RAN) 112 including, e.g., an eNodeB 130. Additional positioning architecture elements may also be deployed to further enhance performance of specific positioning methods. For example, deploying radio beacons 116 and 118 is a cost-efficient solution which may significantly improve positioning performance indoors and also outdoors by allowing more accurate positioning, for example, with proximity location techniques.

To meet LBS demands, the LTE network will deploy a range of complementing methods characterized by different performance in different environments. Depending on where the measurements are conducted and the final position is calculated, the methods can be UE-based, UE-assisted or network-based, each with own advantages. The following methods are available in the LTE standard for both the control plane and the user plane, Cell ID (CID),
UE-assisted and network-based E-CID, including network-based angle of arrival (AoA),
UE-based and UE-assisted A-GNSS, including A-GPS,
UE-assisted Observed Time Difference of Arrival (OTDOA).

Hybrid positioning, fingerprinting positioning and methods using adaptive E-CID (AECID) do not require additional standardization and are therefore also possible with LTE. Furthermore, there may also be UE-based versions of the methods above, e.g. UE-based GNSS, e.g. GPS, or UE-based OTDOA, etc. There may also be some alternative positioning methods such as proximity based location. UTDOA may also be standardized in a later LTE release, since it is currently under discussion in 3GPP. Similar methods, which may have different names, also exist in other RATs, e.g. WCDMA or GSM. Some of these positioning techniques will now be discussed in more detail.

E-CID positioning exploits the advantage of low-complexity and fast positioning with CID which exploits the network knowledge of geographical areas associated with cell IDs, but enhances positioning further with more measurement types. With Enhanced Cell ID (E-CID), the following sources of position information are involved: the Cell Identification (CID) and the corresponding geographical description of the serving cell, the Timing Advance (TA) of the serving cell, and the CIDs and the corresponding signal measurements of the cells, up to 32 cells in LTE, including the serving cell, as well as AoA measurements. The following UE measurements can be utilized for E-CID in LTE: E-UTRA carrier Received Signal Strength Indicator (RSSI), Reference Signal Received Power (RSRP), Reference Signal Received Quality (RSRQ), and UE Rx-Tx time difference. The E-UTRAN measurements available for E-CID are eNodeB Rx-Tx time difference, also called TA Type 2, TA Type 1 being (eNodeB Rx-Tx time difference)+(UE Rx-Tx time difference), and UL AoA, UE Rx-Tx measurements are typically used for the serving cell, whilst e.g. RSRP and RSRQ as well AoA can be utilized for any cell and can also be conducted on a frequency different from that of the serving cell.

UE E-CID measurements are reported by the UE to the positioning server (e.g. Evolved SMLC, or E-SMLC, or SUPL Location Platform, or SLP, in LTE) over the LTE Positioning Protocol (LPP), and the E-UTRAN E-CID measurements are reported by the eNodeB to the positioning node over the LPP Annex protocol (LPPa). The user equipment may receive assistance data from the network.

The OTDOA positioning method makes use of the measured timing of downlink signals received from multiple eNodeBs at the user equipment. The user equipment measures the timing of the received signals using assistance data received from the LCS server, and the resulting measurements are used to locate the user equipment in relation to the neighboring eNodeBs.

With OTDOA, a terminal measures the timing differences for downlink reference signals received from multiple distinct locations. For each measured neighbor cell, the user equipment measures Reference Signal Time Difference (RSTD) which is the relative timing difference between neighbor cell and the reference cell. The UE position estimate is then found as the intersection of hyperbolas corresponding to the measured RSTDs. At least three measurements from geographically dispersed base stations with a good geometry are needed to solve for two coordinates of the terminal and the receiver clock bias. In order to solve for position, precise knowledge of the transmitter locations and transmit timing offset is needed.

Inter-frequency measurements may in principle be considered for any positioning method, even though currently not all measurements are specified by the standard as intra- and inter-frequency measurements. The examples of inter-frequency measurements currently specified by the standard are Reference Signal Time Difference (RSTD) used for OTDOA, RSRP and RSRQ which may be used e.g. for fingerprinting or E-CID.

The UE performs inter-frequency and inter-RAT measurements in measurement gaps. The measurements may be done for various purposes: mobility, positioning, self organizing network (SON), minimization of drive tests etc. Furthermore the same gap pattern is used for all types of inter-frequency and inter-RAT measurements. Therefore E-UTRAN must provide a single measurement gap pattern with constant gap duration for concurrent monitoring, i.e. cell detection and measurements, of all frequency layers and RATs. The E-UTRA UE supports two configurations comprising of the maximum gap repetition period (MGRP) of 40 and 80 ms; both with the measurement gap length of 6 ms. In practice due to the frequency switching time less than 6 sub-frames but at least 5 full sub-frames are available for measurements within each such measurement gap.

In LTE, measurement gaps are configured by the network to enable measurements on the other LTE frequencies and/or other RATs, e.g. UTRA, GSM, CDMA2000, etc. The gap configuration is signaled to the UE over RRC protocol as part of the measurement configuration. A UE that requires measurement gaps for positioning measurements, e.g., OTDOA, may send an indication to the network, e.g. eNodeB, upon which the network may configure the measurement gaps. Furthermore, the measurement gaps may need to be configured according to a certain rule, e.g. inter-frequency RSTD measurements for OTDOA require that the measurement gaps are configured according to the inter-frequency requirements in 3GPP 36.133, Section 8.1.2.6, e.g. not overlapping with PRS occasions of the serving cell and using gap pattern #0.

In general, in LTE inter-RAT measurements are typically defined similar to inter-frequency measurements, e.g. they may also require configuring measurement gaps like for inter-frequency measurements, but just with more measurements restrictions and often more relaxed requirements for inter-RAT measurements. As a special example, there may also be multiple networks using the overlapping sets of RATs. The examples of inter-RAT measurements specified currently for LTE are UTRA FDD CPICH RSCP, UTRA FDD carrier RSSI, UTRA FDD CPICH Ec/No, GSM carrier RSSI, and CDMA2000 1x RTT Pilot Strength.

For positioning, assuming that LTE FDD and LTE TDD are treated as different RATs, the current standard defines requirements only for FDD-TDD and TDD-FDD inter-frequency measurements, and the requirements are different in the two cases. There are no other inter-RAT measurements specified within any separate RAT for the purpose of positioning and which are possible to report to the positioning node, e.g. E-SMLC in LTE.

Intra-RAT multi-carrier system means that all the component carriers belong to the same RAT e.g. LTE FDD multi-carrier system, LTE TDD multi-carrier system, UTRAN FDD multi-carrier system, UTRAN TDD multi-carrier system and so on.

In LTE multi-carrier system, it is possible to aggregate a different number of component carriers of different bandwidths in the UL and the DL as illustrated in FIGS. 8 and 9.

The component carriers may be contiguous, e.g., as shown in FIG. 8, or non-contiguous, e.g., as shown in FIG. 9. Furthermore in case of non-contiguous carriers, they may belong to the same frequency band or to different frequency bands. A hybrid carrier aggregation scheme comprising of contiguous and non-contiguous component carriers are also envisaged in LTE. The simultaneous transmission and/or reception of the carriers enable the UE to significantly increase its data reception and transmission rates. For instance, 2×20 MHz aggregated carriers in LTE multi-carrier system would theoretically lead to two-fold increase in data rate compared to that attained by a single 20 MHz carrier.

In LTE advanced, several contiguous and non-contiguous carrier aggregation scenarios are being considered. A scenario comprising of 5 contiguous component carriers each of 20 MHz, i.e. 5×20 MHz, is being considered for LTE TDD. Similarly for LTE FDD a scenario comprising of 4 contiguous component carriers each of 20 MHz, i.e. 5×20 MHz, in the downlink and 2 contiguous component carriers in the uplink is being studied.

In inter-RAT multi-carrier system, the component carriers may belong to different RATs. For example, in such systems one CC may belong to LTE FDD and another one to LTE TDD. Yet another example comprises of CCs belonging to UTRAN FDD and E-UTRAN FDD. In such systems one of the RATs may be considered as the main or primary RAT while the remaining ones as the auxiliary RATs.

A number of issues arise when considering how to adapt positioning and the provision of assistance data to systems which employ multi-carrier/carrier aggregation techniques.

LTE uses orthogonal frequency division multiplexing (OFDM) in the downlink and discrete Fourier transform (DFT)-spread OFDM in the uplink. The basic LTE downlink physical resource can thus be seen as a time-frequency grid as illustrated in FIG. 10, where each resource element corresponds to one OFDM subcarrier during one OFDM symbol interval. In the time domain, LTE downlink transmissions are organized into radio frames of 10 ms, each radio frame consisting of ten equally-sized subframes of length $T_{subframe}=1$ ms as shown in FIG. 11.

Furthermore, the resource allocation in LTE is typically described in terms of resource blocks, where a resource block corresponds to one slot, such as 0.5 ms, in the time domain and 12 contiguous subcarriers in the frequency domain. Resource blocks are numbered in the frequency domain, starting with 0 from one end of the system bandwidth. Downlink transmissions are dynamically scheduled, i.e., in each subframe the base station—typically referred to as an eNB in LTE—transmits control information indicating to which terminals and on which resource blocks the data is transmitted during the current downlink subframe. This control signaling is typically transmitted in the first 1, 2, 3 or 4 OFDM symbols in each subframe. A downlink signal with 3 OFDM symbols as the control region is illustrated in FIG. 12.

SUMMARY

An object is to improve performance of a positioning session.

According to an aspect, the object is achieved by a method in a positioning node for providing complementary assistance data to be used by a user equipment during a positioning session for determining a position of the user equipment. A change from a first cell to a second cell occurs during the positioning session. The user equipment is served by the first cell and is configured to receive control information from the first cell before the change and the user equipment is served by the second cell and is configured to receive control information from the second cell after the change. The positioning node obtains information identifying the second cell for which complementary assistance data is to be generated. Next, the positioning node generates the complementary assistance data relating to at least the second cell. The complementary assistance data comprises assistance data adapted to the second cell when the second cell is configured to provide control information to the user equipment. The positioning node sends the complementary assistance data to the user equipment, thereby providing the complementary assistance data to be used by the user equipment during the positioning session.

According to another aspect, the object is achieved by a positioning node for providing complementary assistance data to be used by a user equipment during a positioning session for determining a position of the user equipment. The user equipment is configured to be served by the first cell and is configured to receive control information from the first cell before a change from a first cell to a second cell. The change occurs during the positioning session. After the change, the user equipment is configured to be served by the second cell and is configured to receive control information from the second cell. The positioning node comprises a processing circuit configured to obtain information identifying the second cell for which complementary assistance data is to be generated. Furthermore, the processing circuit is configured to generate the complementary assistance data relating to at least the second cell. The complementary assistance data comprises assistance data adapted to the second cell when the second cell is configured to provide control information to the user equipment. The positioning node comprises a transmitter configured to send the complementary assistance data to the user equipment in advance of the change, thereby being configured to provide the complementary assistance data to be used by the user equipment during the positioning session.

According to a further aspect, the object is achieved by a method in a user equipment for enabling continuation of a positioning session with a positioning node serving the user equipment. A change from a first cell to a second cell occurs during the positioning session. The user equipment is served by the first cell and is configured to receive control information from the first cell before the change and the user equipment is served by the second cell and is configured to receive control information from the second cell after the change. The user equipment receives, from the positioning node, complementary assistance data in advance of the change. The complementary assistance data relates to the second cell. The complementary assistance data comprises assistance data adapted to the second cell when the second cell is configured to provide control information to the user equipment. The user equipment processes the complementary assistance data. The complementary assistance data is used by the user equipment (120) to configure positioning measurements performed during the positioning session.

According to yet another aspect, the object is achieved by a user equipment for enabling continuation of a positioning session with a positioning node configured to serve the user equipment. The user equipment is configured to be served by the first cell before a change from a first cell to a second cell. The change occurs during the positioning session. The user equipment is configured to receive control information from the first cell before the change and the user equipment is configured to be served by the second cell and is configured to receive control information from the second cell after the change. The user equipment comprises a receiver configured to receive, from the positioning node, complementary assistance data in advance of the change. The complementary assistance data relates to the second cell. The complementary assistance data comprises assistance data adapted to the second cell when the second cell is configured to provide control information to the user equipment. The user equipment further comprises a processing circuit configured to process the complementary assistance data. The user equipment (120) is configured to use the complementary assistance data for configuring positioning measurements performed during the positioning session.

According to a still further aspect, the object is achieved by a method in a radio network node for providing complementary assistance data to be used by a user equipment. The complementary assistance data is to be provided in advance of a change from a first cell to a second cell. The user equipment is served by the first cell and is configured to receive control information from the first cell before the change. The change occurs during a positioning session. The user equipment is served by the second cell and is configured to receive control information from the second cell after the change. The radio network node receives the complementary assistance data relating to the second cell. Next, the radio network node sends the complementary assistance data to the user equipment in advance of the change, thereby providing the complementary assistance data.

According to still another further aspect, the object is achieved by a radio network node for providing complementary assistance data to be used by a user equipment. The complementary assistance data is to be provided in advance of a change from a first cell to a second cell. The user equipment is configured to be served by the first cell and is configured to receive control information from the first cell before the change. The change occurs during a positioning session. The user equipment is configured to be served by the second cell and is configured to receive control information from the second cell after the change. The radio network node comprises a receiver configured to receive complementary assistance data relating to the second cell. The radio network node further comprises a transmitter configured to send the complementary assistance data to the user equipment in advance of the change, thereby being configured to provide the complementary assistance data.

Generally, embodiments herein provide a solution for providing complementary assistance data such as to improve performance of the positioning session. Thanks to that the positioning node sends the complementary assistance data to the user equipment before the cell change, the user equipment may use the complementary assistance data for positioning purposes after the change has occurred. As an example, the complementary assistance data may be assistance data for cells that did not serve the user equipment before the change and/or assistance data for the second cell, such as an expected primary component carrier, a cell to which handover may be made or the like. In another embodiment, the contents of the proactively provided complementary assistance data is different from that of the 'normal' assistance data for at least one cell which appears in both sets of the assistance data. The user equipment receives the complementary assistance data, which is adapted to the situation, in terms of neighbor cells, primary cells, reference cells, relative timing information and the like, after the change. Next, the user equipment processes the complementary assistance data, such as uses the complementary assistance data to improve performance of the positioning session. As a result, the above mentioned object is achieved.

An advantage is that a continuous, i.e. interruption free, positioning session is made possible, even when the change occurs during the positioning session. In this manner, increased or maintained measurement and positioning accuracy at for example carrier switching, handover or the like, is obtained.

Moreover, reduced positioning time, i.e. no or shorter interruption of positioning procedure within a positioning session, is obtained thanks to the complementary assistance data pertaining to the second cell.

BRIEF DESCRIPTION OF THE DRAWINGS

The exemplary embodiments described below will be understood, in conjunction with the drawings submitted herewith in which:

FIG. 7 depicts an LTE positioning architecture in which embodiments can be implemented;

FIGS. 8 and 9 show examples of carrier aggregation;

FIG. 10 represents an LTE OFDM downlink signal in the frequency/time domain;

FIG. 11 shows a subframe associated with an LTE OFDM signal in the time domain.

DETAILED DESCRIPTION

Figure 1:
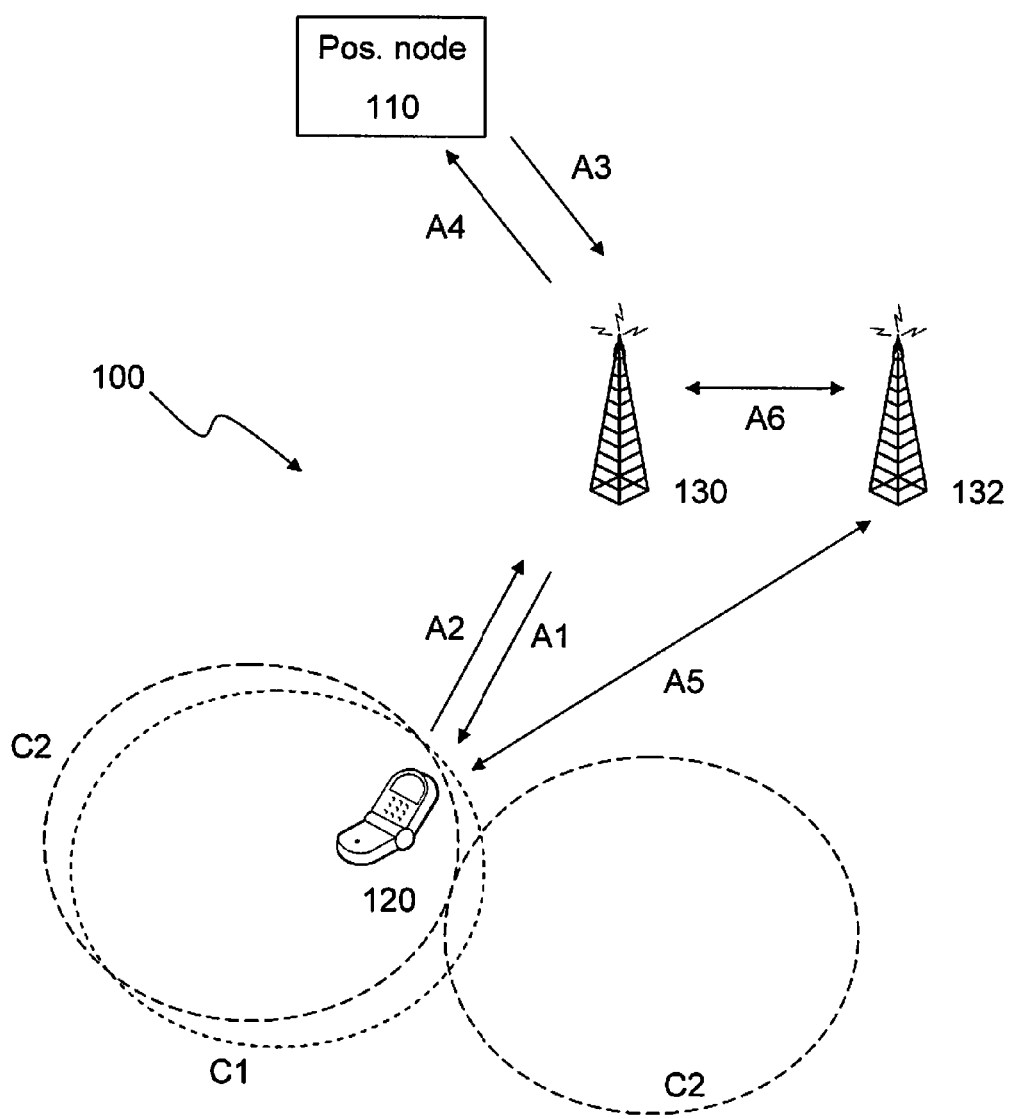
FIG. 1 is a schematic overview of a radio communications system.

The following detailed description of the exemplary embodiments refers to the accompanying drawings. The same reference numbers in different drawings identify the same or similar elements. Also, the following detailed description does not limit the invention. Instead, the scope of the invention is defined by the appended claims. The following embodiments are discussed, for simplicity, with regard to the terminology and structure of LTE systems. However, the embodiments to be discussed next are not limited to LTE systems but may be applied to other telecommunications systems.

Reference throughout the specification to "one embodiment" or "an embodiment" means that a particular feature, structure, or characteristic described in connection with an embodiment is included in at least one embodiment. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

As mentioned briefly above, the implementation of new radio communication systems and standards may have impacts on positioning and the provision and usage of assistance data when considered in the context of multi-carrier or carrier aggregation (CA) systems. For example, there is no concept of complementary positioning assistance data in CA. By this it is meant that, in particular, in conventional positioning systems, no complementary information in terms of assistance data related to a future event is provided to the UE in advance. An example of such a future event is the changing of the primary carrier in the UL or DL or both. The change in the primary cell, which may also be associated with changing the primary carrier, may result in positioning performance degradation e.g. due multiple sequential carrier changes, which may often occur, and/or long measurement period, which may occur in dense deployments with small cells and/or fast moving UEs.

Another issue is that in LTE the primary carrier in the UL or in the DL or in both directions can be changed by the serving eNodeB at any time. However, the assistance data for OTDOA measurements in LTE is sent to the UE, or any LCS target device, by the positioning node, e.g. E-SMLC or SLP. Due to these independent operations, it is quite probable that the UE is unable to complete the positioning session or at least this will degrade the performance when primary carrier is switched. The OTDOA being used for emergency calls or for services with stringent requirements may not be able to meet the desired quality under PCC switching. Examples of stringent requirements are positioning accuracy or response time requirements. Yet another issue is that there are no requirements that allow for including neighbor cells on the different frequencies in the same OTDOA assistance data, i.e. this may not be supported by all UEs, although carrier switching is expected to be more dynamic in the multi-carrier systems with CA capability.

These and other deficiencies of conventional positioning techniques and systems are addressed by these embodiments. For example, embodiments described herein include, among other things, that the network provides, in advance, the assistance data for cells on the expected new frequency and/or the expected primary CC in order to facilitate the LCS target device, such as a user equipment, to perform the positioning measurements in a multi-carrier or carrier aggregation system. Such embodiments as will be described below include, but are not limited to, methods, systems and devices for predicting primary carrier switching and also the specific new primary carrier when there are more than 2 CCs, methods, systems and devices in the network of proactively providing complementary assistance data, and methods and devices for UE behavior to treat the complementary assistance data which is provided by the network.

Prior to discussing such embodiments in detail, some caveats and terminologies used in these embodiments are provided. The described embodiments mainly focus on a carrier switching in a carrier aggregation system, but they may also apply in a system without carrier aggregation capability, i.e. at an inter-frequency or inter-RAT handover. Furthermore, inter-frequency shall be understood in a general sense, e.g. as intra-band or inter-band. Primary carrier shall be understood as a serving cell carrier/frequency. Further, the embodiments described herein may or may not be associated with changing frequency or carrier, but may also related to a cell change in general, e.g., intra-frequency handover.

Carrier switching is associated with changing a cell frequency and thus typically also changing the serving or primary cell. However, changing a cell may also occur at inter-frequency handover, which is not limited to carrier aggregation systems. The embodiments of the current disclosure apply in general for carrier or frequency switching, but also at any cell change which may occur due to handover or changing the primary cell while not changing the carrier, e.g., intra-frequency handover.

Although the description is mainly given for UE, it should be understood by the skilled in the art that "UE" is a non-limiting term which means any wireless device or node. A UE may for example be a PDA, laptop, mobile, sensor, relay, or even a small base station that is being positioned, i.e. a LCS target in general.

A "positioning node" described in different embodiments is a node with positioning functionality. For example, for LTE it may be understood as a positioning platform in the user plane, such as SLP in LTE, or a positioning node in the control plane, such as E-SMLC in LTE. SLP may also consist of SLC and SPC, where SPC may also have a proprietary interface with E-SMLC.

Embodiments herein are not limited to LTE, but may apply to any radio access network (RAN), single- or multi-RAT. Some other RAT examples are LTE-Advanced, UMTS, GSM, cdma2000, WiMAX, and WiFi. The signaling described herein is either via direct links or logical links. For example, the signaling is via higher layer protocols and/or via one or more network nodes. For example, in LTE in the case of signaling between E-SMLC and LCS Client the positioning result may be transferred via multiple nodes, such as at least via MME and GMLC.

FIG. 1 shows a schematic overview of an exemplifying radio communication system 100, such as a LTE system. In other examples, the radio communication system 100 may an evolution of the LTE system 100, i.e. a radio communication system using the same basic principles as regards features relevant to the present solution.

The LTE system 100 comprises a positioning node 110, such as an E-SMLC, an SLP or the like.

FIG. 1 also shows a user equipment 120, comprised in the LTE system 100. As an example, the user equipment 120 may be a mobile phone, a cellular phone, a Personal Digital Assistant (PDA) equipped with radio communication capabilities, a smartphone, a laptop equipped with an internal or external mobile broadband modem, a portable electronic radio communication device or the like.

Moreover, the LTE system 100 comprises a radio network node 130, such as a radio base station, an evolved-NodeB, eNB or the like.

In FIG. 1, a first cell C1 and a second cell C2 are shown. According to some embodiments herein, the second cell C2 may be essentially overlapping with the first cell C1 as shown by the leftmost long-dashed second cell C2. As an example, these embodiments may be applicable when the radio communication system 100 is a carrier aggregation system. In some other embodiments, the second cell C2 may be neighboring to the first cell C1 as shown by the rightmost long-dashed second cell C2.

In some embodiments, the radio network node 130 operates the first and second cells C1, C2. In some embodiments, the first cell C1 is operated a first carrier frequency and the second cell C2 is operated at a second carrier frequency. In some embodiments, the second cell C2 is also operated at the first carrier frequency.

As shown in FIG. 1, the radio communication system 100 may according to some embodiments further comprise a second radio network node 132, such as a radio base station, an evolved-NodeB, eNB or the like.

In some embodiments, the radio network node 130 operates the first cell C1 and the second radio network node 132 operates the second cell C2. In some embodiments, the first cell C1 is operated at a first carrier frequency and the second cell C2 is operated at a second carrier frequency. In some embodiments, the second cell C2 is also operated at the first carrier frequency.

Arrows A1, A2 indicate that the user equipment 120 may communicate with the radio network node 130. An arrow A3 indicates that information may be transferred to the radio network node 130 from the positioning node 110, possibly via other network nodes (not shown). An arrow A4 indicates that information may be transferred from the radio network node 130 to the positioning node 110, possibly via other network nodes (not shown). An arrow A5 indicates that information may be transferred between the second radio network node 132 and the user equipment 120. An arrow A6 indicates that information may be transferred between the radio network node 130 and the second radio network node 132.

Figure 2:
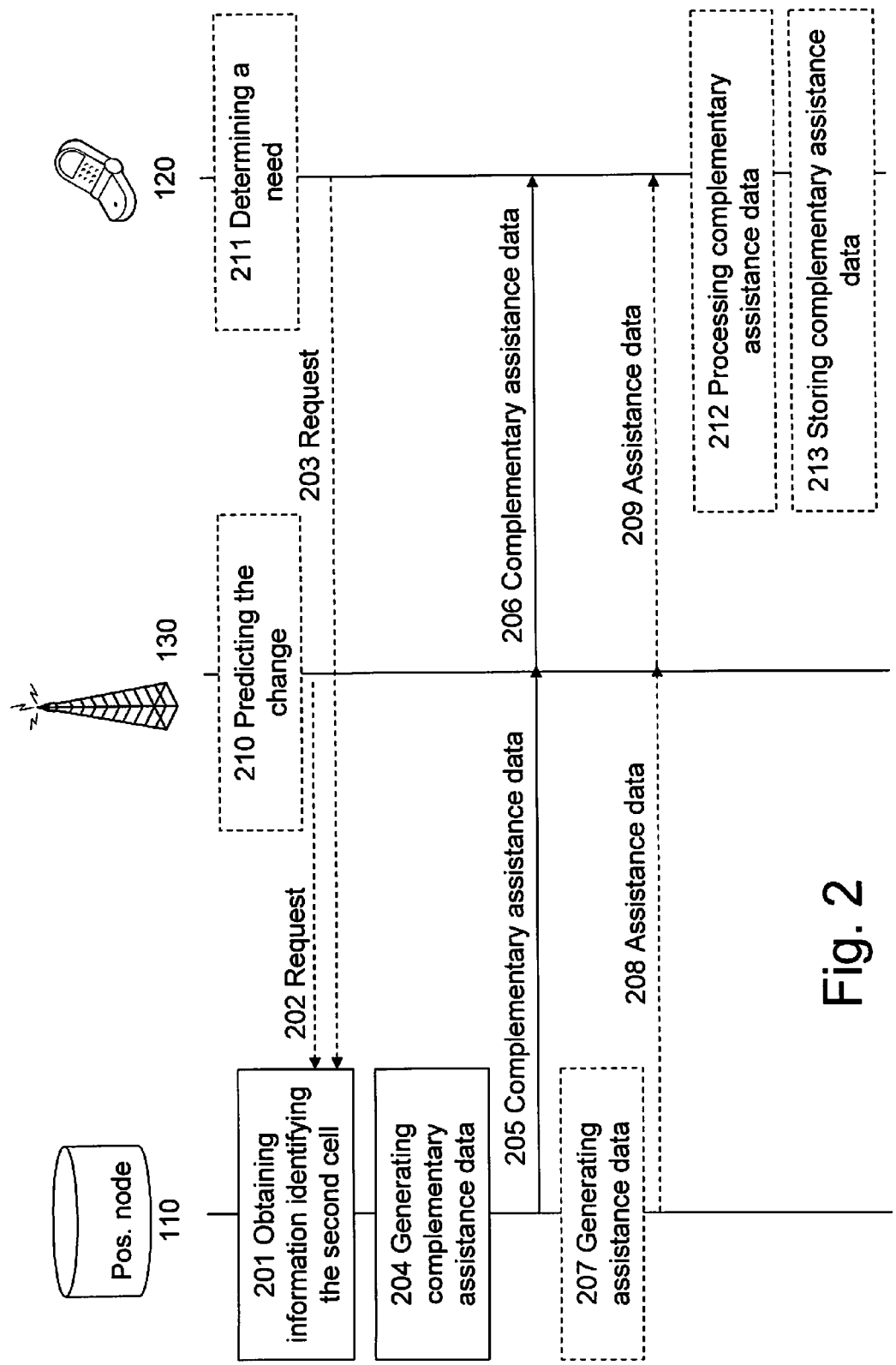
FIG. 2 shows a schematic, combined signaling and flow chart of exemplifying methods performed in the radio communication system according to FIG. 1, FIGS. 3-5 are flow charts illustrating various embodiments.

In FIG. 2, a schematic combined signaling and flow chart of exemplifying methods performed in the radio communication system according to FIG. 1 is shown. The positioning node 110 performs a method for providing complementary assistance data to be used by the user equipment 120 during a positioning session for determining a position of the user equipment 120. The user equipment 120 performs a method for enabling continuation of the positioning session with the positioning node 110 serving the user equipment 120. The radio network node 130 performs a method for providing complementary assistance data to be used by the user equipment 120.

A change from the first cell C1 to the second cell C2 occurs during the positioning session. Before the change, the user equipment 120 is served by the first cell and is configured to receive control information from the first cell, and after the change, the user equipment 120 is served by the second cell and is configured to receive control information from the second cell. It shall here be understood that the expression "configured to receive control information from the first/second cell" encompasses e.g. that the first/second cell is a primary cell, or a primary component carrier.

In some embodiments, the change is a handover from the first cell to the second cell. As an example, the handover may be an intra frequency handover or an inter frequency handover.

In some embodiments, the first cell operates on a first carrier frequency and the second cell operates on a second carrier frequency.

In some embodiments the first carrier frequency and second carrier frequency may operate on a first frequency band and a second frequency band, respectively.

In some embodiments, the first and second frequency bands are the same. This means that the first and second carrier frequencies belong to either the first frequency band or to the second frequency band. Accordingly inter-frequency handover may be performed as inter-band inter-frequency handover or as intra-band inter-frequency handover.

In some embodiments, both the first cell and the second cell operate on either the first carrier frequency or the second carrier frequency. In these embodiments, the change may be an intra-frequency handover, i.e. when the first and second cells operate on the same carrier frequency.

In some embodiments, the first carrier frequency is a first primary component carrier before the change and the second carrier frequency is a second primary component carrier after the change. The first primary component carrier and the second primary component carrier may operate on the first frequency band and the second frequency band, respectively, or on any of the first and second frequency bands. In some embodiments the first and second frequency bands are the same. This means the first and the second primary component carriers belong to either the first frequency band or to the second frequency band. In these embodiments, the change is primary component carrier change or switch in a carrier aggregation or a multi-carrier system.

The following actions, such as steps, may be performed according to some embodiments.

Action 211

The user equipment 120 determines a need for complementary assistance data, for example by predicting that the change from the first cell to the second cell is to occur during the positioning session.

In some embodiments, the predicting of the change is performed by comparing a threshold value for a measurement to at least one of:
  a measured value for the measurement towards serving cell, and
  a measured value for the measurement towards a neighbor cell.

As an example, the measured value for the measurement towards the serving cell is Reference Signal Received Power (RSRP), Reference Signal Received Quality (RSRQ) or any other measure used for determining need for the change and/or wherein the measured value for the measurement towards the neighbor cell is RSRP or RSRQ. As a further example, the measured value the measured value for the measurement towards serving cell and/or the measured value for the measurement towards the neighbor cell may be any other measure used for determining the need for change.

In some embodiments, the predicting of the change is further performed based on at least one of the following criteria:
  Utilization of channel,
  Radio link monitoring performance of serving radio link,
  HARQ performance,
  RLC performance,
  Carrier aggregation type,
  Frequency band characteristics of the first carrier and/or second carrier, and the like.

Action 203

The user equipment 120 then sends a request to the positioning node for complementary assistance data, e.g. an indication indicating the need for complementary assistance data.

Action 201

The positioning node 110 receives a request for complementary assistance data from user equipment 120, comprising information identifying the second cell for which complementary assistance data is to be generated in advance of the change from the first cell to the second cell.

The complementary assistance data may complement the available assistance data by including assistance data for at least one new cell.

Another possibility is that the complementary assistance data includes information for at least one cell which information is comprised in both complementary and available assistance data. For example, the cell was previously a secondary serving cell for the user equipment 120, meaning that certain assistance data was already available. However, the cell is about to become the primary serving cell for user equipment 120. In such a case, the information enables or improves positioning since the complementary assistance data includes information which, for example, includes assistance data that applies for when the second cell is the serving/primary cell, i.e. the cell providing control information to the user equipment.

Action 204

The positioning node 110 generates the complementary assistance data relating to at least the second cell. The complementary assistance data comprises assistance data adapted to the second cell when the second cell is configured to provide control information to the user equipment 120. As an example, the complementary assistance data comprises assistance data relating to a situation where the second cell is already providing control information to the user equipment, i.e. as if the change to the second cell has already occurred. As an example, the complementary assistance data comprises information about neighbor cells, primary cells, reference cells, relative timing information and the like. Such information is adapted to the situation in terms of which cell is providing control information to the user equipment after the change. Here, said cell providing control information is the second cell.

As another example, after a change of serving cell, the second cell C2 becomes the serving cell instead of the first cell C1 which becomes a neighbor cell after the cell change. Cells C1 and C2 may be on different frequencies, e.g., f1 and f2, respectively. When the serving cell is the first cell C1, typically better performance is achieved when other cells in the assistance data are also on f1, given that there is a sufficient number of cells on this frequency to ensure good position accuracy. After the cell change, positioning measurements on f2 may be more preferable. The proactive assistance data may therefore comprise at least some cells on frequency f2. Furthermore, if the assistance data contains a reference cell and the reference cell may change with the cell change, then the data for other cells (e.g., timing offset, RSTD uncertainty or muting information) in the assistance data may need to be updated respectively, i.e., being provided with respect to the new reference cell.

Action 205

The positioning node 110 sends and the radio network node receives complementary assistance data in advance of the change.

As an example, the positioning node 110 may be informed of when the change is to take place by a node managing mobility, such as an MME. In some examples, the positioning node 110 may also be informed by the radio network node 130, such as an eNodeB.

Action 206

The radio network node 130 sends and the user equipment 120 receives the complementary assistance data relating to the second cell in advance of the change, thereby providing the complementary assistance data. The complementary assistance data comprises assistance data adapted to the second cell when the second cell is configured to provide control information to the user equipment 120.

In some embodiments, the complementary assistance data is received prior to a beginning of the positioning session.

A result of action 205 and 206 is that the positioning node 110 sends the complementary assistance data to the user equipment 120 via the radio network node 130. In this manner, the positioning node 110 provides the complementary assistance data to the user equipment 120 in advance of the change.

Action 207

In some embodiments, the positioning node 110 generates assistance data pertaining to the cell, or cells, serving the user equipment 120 before the change. As an example, the complementary assistance data generated in action 204 may be complementary in view of assistance data generated here in action 207.

Action 208

The positioning node 110 sends the generated assistance data to the user equipment via the radio network node 130. Thus, the user equipment 120 receives the generated assistance data. This action is performed when the positioning session is initiated as known in the art.

Action 209

In some embodiments, the radio network node 130 sends and the user equipment 120 receives the generated assistance data. The generated assistance data is received by the radio network node 130 from the positioning node 110. Thus, the radio network node 130 merely forwards the generated assistance data to the user equipment 120. This action is performed when the positioning session is initiated as known in the art.

Action 212

The user equipment 120 processes the complementary assistance data, thereby enabling continuation of the positioning session. The complementary assistance data is used by the user equipment 120 to configure positioning measurements performed during the positioning session.

As an example, the user equipment 120 processes the complementary assistance data, as well as the assistance data received in action 209, and uses results from said processing for configuring positioning measurements. Configuring positioning measurements according to the complementary assistance data and/or the assistance data may comprise e.g.:
- configuring measurement bandwidth for one or more cells,
- configuring the expected signal search window, i.e. the window centre and the window length,
- configuring measurement occasions in time e.g. aligned with PRS transmission occasions,
- accounting for PRS muting,
- creating measurement groups or cell groups,
- requesting measurement gap configuration compliant with the complementary assistance data.

In some embodiments, the complementary assistance data is processed during the positioning session.

Action 213

In some embodiments, the user equipment 120 stores the complementary assistance data.

According to some other embodiments, again with reference to FIG. 2, actions 211 and 203 above may be replaced by actions 210 and 202. The actions 210 and 202 will be explained in the following.

Action 210

The radio network node 130 predicts that the change from the first cell to the second cell is to occur during the positioning session.

As an example, the predicting of the change is performed by comparing a threshold value for a measurement, which is reported to the radio network node 130, to at least one of:
- a measured value for the measurement towards serving cell, and
- a measured value for the measurement towards a neighbor cell.

In some embodiments, the predicting of the change is further performed based on at least one of the following criteria:
- Utilization of channel,
- Radio link monitoring performance of serving radio link,
- Hybrid Automatic Repeat reQuest (HARQ) performance,
- Radio Link Control (RLC) performance,
- Carrier aggregation type,
- Frequency band characteristics of the first carrier and/or second carrier, and the like.

Figure 3:
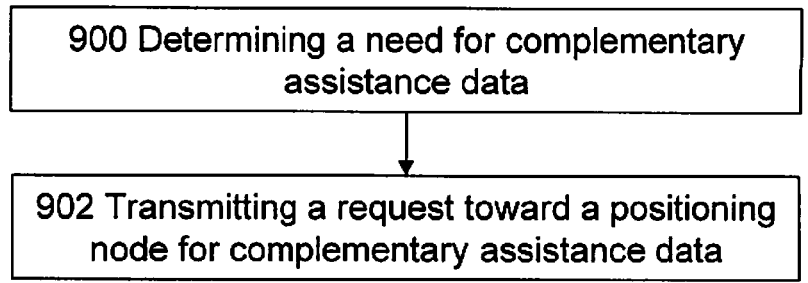

Please see step 900 of FIG. 3 for more details on criteria relating to the predicting of the change.

As an example, the measured value may be indicative of the RLC performance measured towards the serving cell or towards the neighbor cell. In other examples, the measured value may be indicative of HARQ performance, utilization of channel etc as described above and in conjunction with step 900 of FIG. 3.

Action 202

In some embodiments, the radio network node 130 sends, to the positioning node, a request for complementary assistance data relating to the user equipment 120.

Now briefly repeating some aspects of the present disclosure:

According to an embodiment, a method for providing complementary assistance data comprises determining a need for complementary assistance data, and transmitting a request or an indication of the determined need toward a positioning node for complementary assistance data. These steps can, for example, be performed by a user equipment or by a network node.

According to another embodiment, a method for providing complementary assistance data comprises identifying that a trigger condition has occurred for a user equipment, generating complementary assistance data and transmitting the complementary assistance data toward the user equipment. These steps can, for example be performed by a positioning node.

According to another embodiment, a method for processing complementary assistance data comprises receiving, at a user equipment, complementary assistance data and interpreting, by the user equipment, the complementary assistance data, and using for configuring positioning measurements.

According to some exemplary embodiments, complementary assistance data is data which can be used by a user equipment to facilitate positioning functionality for an anticipated switch from, for example, one component carrier to another component carrier in a radio communication system which employs multi-carrier or carrier aggregation techniques.

With this in mind, various further embodiments will be described in the following. Starting with the flowchart of FIG. 3, a determination can be made that a UE needs, or may need, complementary assistance data at step 900. This can involve, for example, identification by a network node, e.g., a radio node or positioning node, or UE of the potential need for the complementary assistance data to facilitate measurements under the scenario when the primary carrier switching is performed in CA. This can occur when, for example, a network node predicts whether the primary carrier switching may occur during a certain time, and/or a network node predicts which secondary carrier may become a new primary carrier; or a UE predicts the potential need for the complementary assistance data, e.g. based on the prediction by the UE when the primary carrier is switched or is expected to be switched. That is the primary carrier switching is a trigger in the UE for assistance data request. A request or indication for complementary assistance data can then be transmitted at step 902, e.g., toward a positioning node. The steps 900 can, for example, be performed either by a UE or a network node. If performed by a UE, then the request transmission in step 902 will, of course, first be transmitted to an eNodeB to which the UE is connected via the air interface, and then toward a positioning node. Complementary assistance data, as used herein, refers to positioning assistance data which can be used by the UE when a certain situation occurs, e.g., the UE switches the carrier.

Thus, according to embodiments, the prediction may be made either in the UE or a radio network node, such as eNodeB or RNC, which may then send an indication to another radio node or the positioning node that the UE may need the complementary assistance data, or in a network node, e.g. positioning node. The prediction time period may be limited to a certain time, e.g. the maximum expected reporting delay e.g. according to the measurement reporting delay requirements such as defined in 3GPP TS 36.133. The prediction or determination associated with step 900 may be based e.g. on one or more of the following:

- UE measurements possibly reported to the network in case the prediction is in a network node, e.g. E-CID measurements like RSRP or RSRQ. For example if primary carrier RSRP is low or below a threshold, then the primary carrier may change soon, or when there is a neighbor cell on a different frequency with a good received signal strength or signal quality. As an example, the good received signal strength may be above a threshold. Any suitable UE measurements may be used, where the suitable measurements may include E-CID measurements, neighbor cell measurements, any type of signal strength or signal quality measurement, SON measurements, minimization of drive tests (MDT), measurements such as paging channel decoding error rate, BCH error rate and the like, etc.
- Radio link monitoring performance e.g. if the radio link failure on PCC occurs or if it occurs N times during time T0 then the PCC may have to be changed.
- HARQ performance on the shared data channel, e.g. if the number of NACK or the HARQ BLER on current PCC is above threshold, then the PCC switching may have to be performed.
- RLC performance on the data or control channel, e.g. if the number of NACK or RLC BLER on current PCC is above threshold then the PCC switching may have to be performed. For example the E-SMLC in LTE may determine the performance of the control channels, which carry assistance data/measurement reports.
- Load on primary/secondary carrier. For example, the load can be expressed in terms of: transmit power, such as an absolute value or the difference, on the PCC and SCC, channel usage, such as mean or aggregated RB usage or RB activity level in LTE.
- Control channel usage on PCC/SCC: All UEs receive the control information, such as resource allocation etc, or most of the control information on the PCC. If the control channels, e.g. PDCCH in DL and PUCCH in UL, on PCC are loaded or their usage is above threshold then it can be predicted that the PCC will be switched. Another alternative is that when the usage of the control channels, e.g. PDCCH in DL and PUCCH in UL, on PCC is above threshold and the usage of the control channels, e.g. PDCCH in DL and PUCCH in UL, on SCC is below another threshold, then the PCC is likely to be switched.
- Number of users with primary carrier etc. For example, when the same PCC is assigned to more users, then it may not be possible to adequately serve data and/or provide control information to the UE via the PCC. Hence, when number of UEs on the same PCC is above a certain threshold, then the PCC can be assumed to be switched.
- Type of intra-RAT CA; inter-band or intra-band. For example it may be more common to switch PCC in inter-band CA.
- Primary carrier in inter-RAT CA. Depending on the RAT of the PCC. Example: whether PCC belongs to WCDMA or LTE in WDMA-LTE inter-RAT CA.
- Frequency band of carriers in case of inter-band. For example it is more probable that PCC is changed in case PCC and SCC belong to frequency bands with very different coverage. For example, PCC and SCC may belong to high and low bands, respectively, or vice versa, e.g. PCC on 2100 MHz and SCC on 700 MHz. Especially when PCC is on high band then the PCC may have to be switched more frequently due to poorer coverage of the higher bands.
- Identification of proximity to a lower-power node such that home eNodeB, or femto RBS, which may also operate as a CSG cell. Or the other way around—identifying that the UE is likely leaving the coverage area of the lower-power node. This is particularly applicable to a scenario with CA-based heterogeneous network deployment.
- The UE 'remembers' the frequencies of the cells it is attending, based on which the UE knows the frequencies and may assumed that if the cell and/or frequency is in the list then it is likely to handover to it when it is detected.

Figure 4:
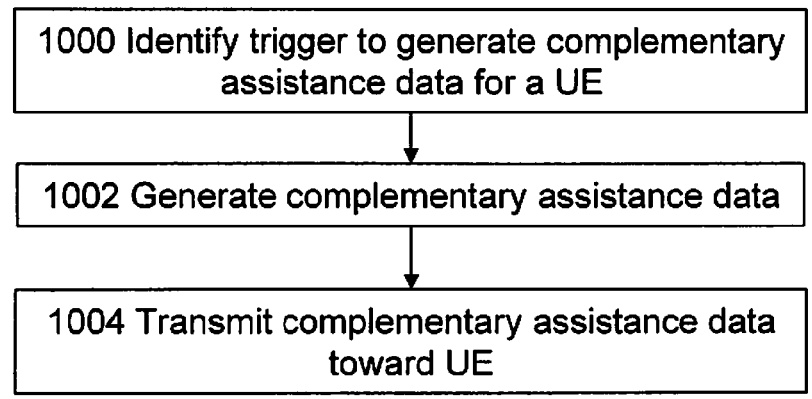

When a need for complementary assistance data has been identified, e.g., as described above, then such data can be provided to a UE as, for example, illustrated in the flow chart of FIG. 4. Therein, at step 1000, a triggering event can be identified as having occurred for a particular UE. This can occur when, for example, a potential carrier switching action and/or a new, or expected new, carrier action has been identified for a particular UE. The trigger can be receipt of an explicit request, as described below or, more generally, the positioning node may detect the UE's potential need for such complementary assistance data in any way, e.g., with or without receiving an explicit request.

In response to this triggering, the complementary assistance data is generated at step 1002. Upon detection of the need for the complementary assistance data, the positioning node may generate the complementary assistance data based on the available information or may request additional information from e.g. the serving radio node or MME or any other network management node or even core network node etc. The UE subscriber information may also be requested e.g. when a potential primary carrier may not be available to all UEs or a potential serving cell may be a CSG cell. The information that may be used for generating the complementary assistance data may be e.g. any one or more of: neighbor cells, number of active UEs on CCs, one or more UE measurements, cell load, load on control channels and/or data channels on CCs, and/or channel usage/channel activity on CCs. The positioning node may use this information to predict the change of cell and also the expected second cell after the change. In some examples, the positioning node may also use this information to verify the need for generating assistance due to the change of the cell.

Once generated, the complementary assistance data is then transmitted toward the UE at step 1004. The steps in FIG. 4 can be performed by a positioning node. If performed by a positioning node, then the complementary assistance data can be transmitted toward the UE in step 1004 by, for example, forwarding the complementary assistance data toward an eNodeB to which the UE is currently connected, as needed. For example, the complementary assistance data may be provided by the positioning node, e.g. via LPP or LPPe in LTE. The complementary assistance data may be provided upon a request sent by
- the UE e.g. via LPP or LPPe, or
- radio node via LLPa. The radio node may be eNodeB or femto BS or LMU, or
- Core network node, e.g. MME in LTE via SLs interface, or
- Network management related nodes e.g. SON, O&M, OSS nodes.

As mentioned above, the complementary assistance data may also be provided by the positioning node without receiving any request from the UE or from any other nodes. In this case, the positioning node autonomously predicts the PCC switching action and/or the new PCC. In one embodiment, the positioning node may still request additional information for deciding whether the complementary assistance data needs to be provided.

In one embodiment, the complementary assistance data is associated with the on-going session identity. In another embodiment, there is also a method in the positioning node that prevents it from providing the assistance data too often, e.g. a timer may be used or a counter of the complementary assistance data transmissions over a time period. In yet, another embodiment, there may be a method in a node or device, e.g. UE, requesting the complementary assistance data to prevent often requests or too many request, e.g. only a certain number of requests may be transmitted per session or over a certain time period.

Figure 5:
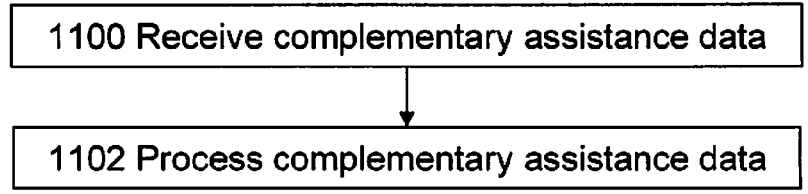

According to embodiments, the UE shall also be capable of at least receiving, processing and using upon a correct event the complementary assistance data, as generally shown in the steps 1100 and 1102 of the flowchart of FIG. 5. The complementary assistance data may be received e.g. via LPP or LPPe. Further, the UE may store the received assistance data in the received format and postpone processing it until when the need for it is realized, e.g. when the UE switches the carriers. Alternatively, the UE may process the complementary assistance data upon receiving and store the information which is a result of the processing.

Using the complementary assistance data comprises, for example, using the received complementary assistance data or the corresponding stored information to enhance UE measurements. For example the user equipment can continue performing measurements after cell change without waiting for new assistance data. In this manner, the measurements, such as positioning measurements, will not be delayed due to change of cell. In an embodiment, the complementary assistance data may be used to facilitate UE measurements intended for positioning. Examples of measurements are RSTD measurements for LTE OTDOA positioning method. However, the data may also be used to facilitate UE measurements not intended for positioning. Example is complementary neighbor cell list (NCL) information to facilitate UE measurements for mobility such as CPICH measurements in HSPA and RSRP/RSRQ measurements in restricted subframes in LTE. The UE performs a cell change when instructed by the network within a certain time. Some example procedures in the handover process are: UE reports measurements, radio node receives measurements, radio network node decides that handover is needed, radio network node initiates handover preparation procedure and when confirmed by MME sends a handover command to the UE, MME or the origin radio network node initiates the resource allocation procedure in the target radio node. Here, the origin radio network node may be a radio network node from which the UE is handed over.

Embodiments also contemplate mechanisms for avoiding confusion at the UE due to receipt of the advance, complementary assistance data described above, e.g., in addition to "regular" assistance data. For example, in one embodiment, the transmitted complementary assistance data are indicated as complementary or complementary for carrier switching which implies a UE behavior that allow for using the data later at a certain condition. The on-going session shall not be immediately aborted upon receiving such data. As an example, a flag or a separate Information Element (IE) may be used to indicate that the transmitted complementary assistance data is indeed complementary assistance data.

In another embodiment, the user equipment autonomously identifies that the received assistance data are complementary. This may be concluded by the user equipment e.g. currently measuring on carrier frequency f1 after scanning the received assistance data and identifying that the cells in the received data set are on a different carrier frequency f2. With the new data available, the UE may decide whether to initiate or not inter-frequency measurements, e.g. due to the insufficient detected cells on f1. However, receiving such complementary assistance data shall not always automatically trigger inter-frequency measurements and e.g. request for inter-frequency measurement gaps.

The complementary assistance data may also be received by the UE upon a request sent by the UE. The request may be sent via LPP or LPPe. The need for assistance data, for example, may be identified or predicted by the user equipment e.g., when the signal strength and/or signal quality measurement on PCC in the serving sector is below threshold. The signal strength and/or signal quality measurement may be RSRP and RSRQ, respectively. Another reason could be the RLM performance. For example if the number of consecutive out of sync detection on PCC is above threshold then UE can identify the need for the assistance data.

The user equipment may also identify the new PCC. For example, if the SCC, or the best SCC if there is more than one SCC, in terms of received quality, such as RSRP/RSRQ, is above threshold, then such SCC could be identified or predicted as the new/expected PCC.

If the need for the complementary assistance data has been identified by the UE, the UE may request the complementary assistance data. The UE may also indicate the expected new primary carrier in the request. This may be done during an on-going positioning session with the primary carries f1 by sending a request to the positioning node for assistance data while including instead of the currently serving/primary cell identification a cell on the other carrier which may potentially the user equipment may switch. A non-serving frequency may be included in the request for the assistance data. The non-serving cell and/or non-serving frequency may or may not be combined with the serving cell and/or serving frequency information in the same request.

Figure 6:
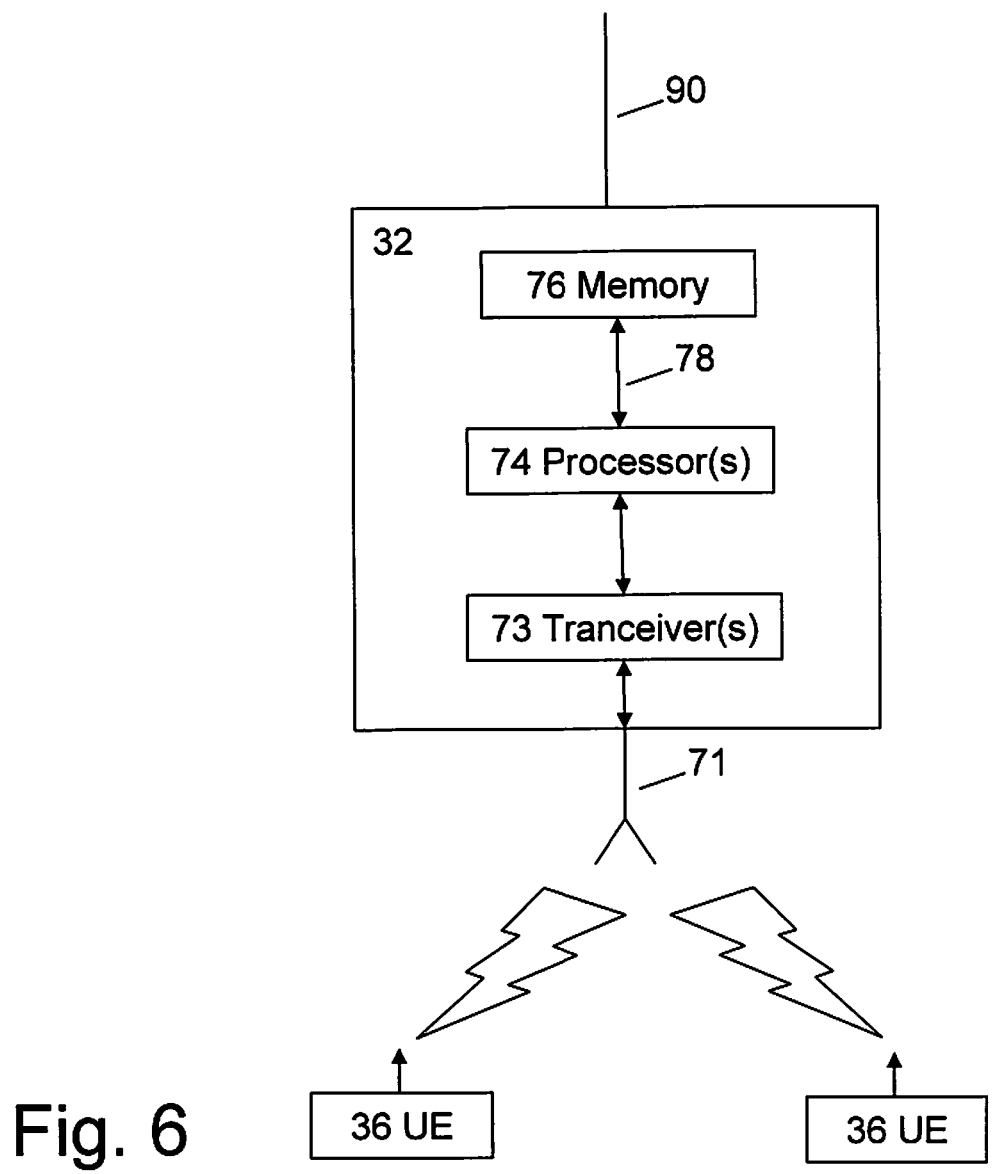
FIG. 6 depicts a generic node in which embodiments can be implemented.
Figure 12:
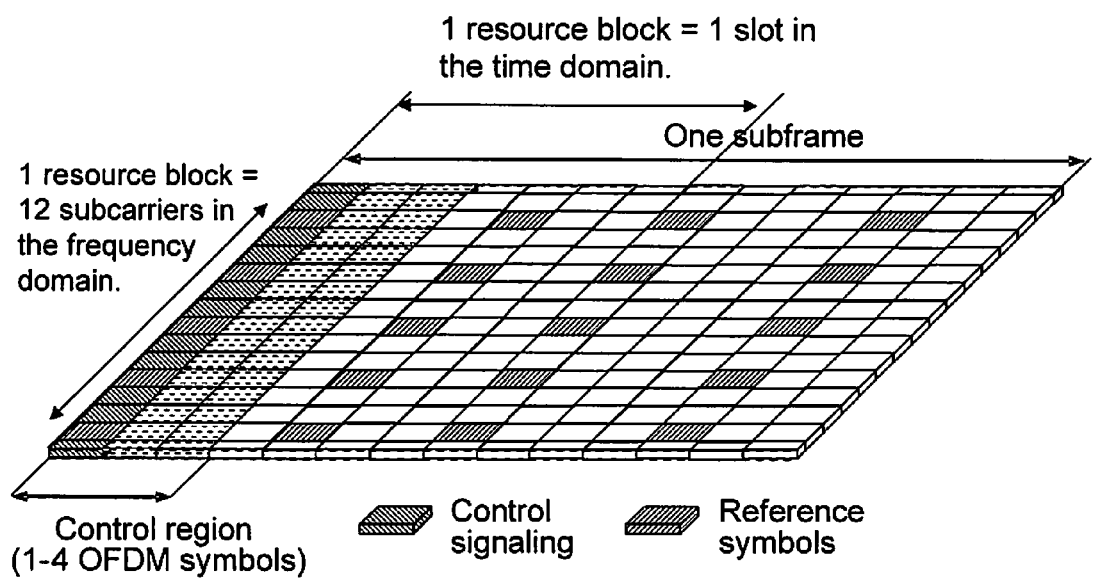
FIG. 12 illustrates a downlink signal with 3 OFDM symbols as the control region.

The foregoing methods can be embodied in nodes or structures which are configured to perform the steps described in the above embodiments. An exemplary positioning node, eNodeB, UE or other node 32 described above is generically illustrated in FIG. 6. If the node 32 includes air interface capability, e.g., if node 32 is a UE or eNodeB, then the node 32 includes one or more antennas 71 connected to processor(s) 74 via transceiver(s) 73. The processor 74 is configured to analyze and process signals received over an air interface via the antennas 71, or alternately signals received from a core network node, via, e.g., an interface 90. The processor(s) 74 may also be connected to one or more memory device(s) 76 via a bus 78. Further units or functions, not shown, for performing various operations as encoding, decoding, modulation, demodulation, encryption, scrambling, precoding, etc. may optionally be implemented not only as electrical components but also in software or a combination of these two possibilities as would be appreciated by those skilled in the art to enable the transceiver(s) 73 and processor(s) 74 to process uplink and downlink signals. The node 32, when operating as a UE or network node, can, for example, be configured as described above to perform the functions associated with a UE or network node as described with respect to FIG. 3 to determine that a need exists for complementary assistance data. When operating as, for example, a positioning node, the transceiver 73 can be omitted, unless, e.g., the positioning node is implemented as part of a node that needs air interface capabilities, and other appropriate interfaces substituted therefore to enable standardized communications and signals to be transmitted which are configured to perform the afore-described relay-related functionality, e.g., generating and transmitting complementary assistance data as shown in FIG. 4 and discussed above.

Among other things, embodiments described herein provide for enhanced positioning performance in multi-frequency and/or multi-RAT CA scenarios which provide for a number of advantages and/or benefits. For example, the positioning session may not be aborted or interrupted when the PCC of a UE is switched. The interruption in the positioning session, if any, when PCC is switched is short i.e. target positioning QoS can be met especially for emergency calls. Overall the positioning performance is not adversely affected when PCC is switched.

Figure 13:
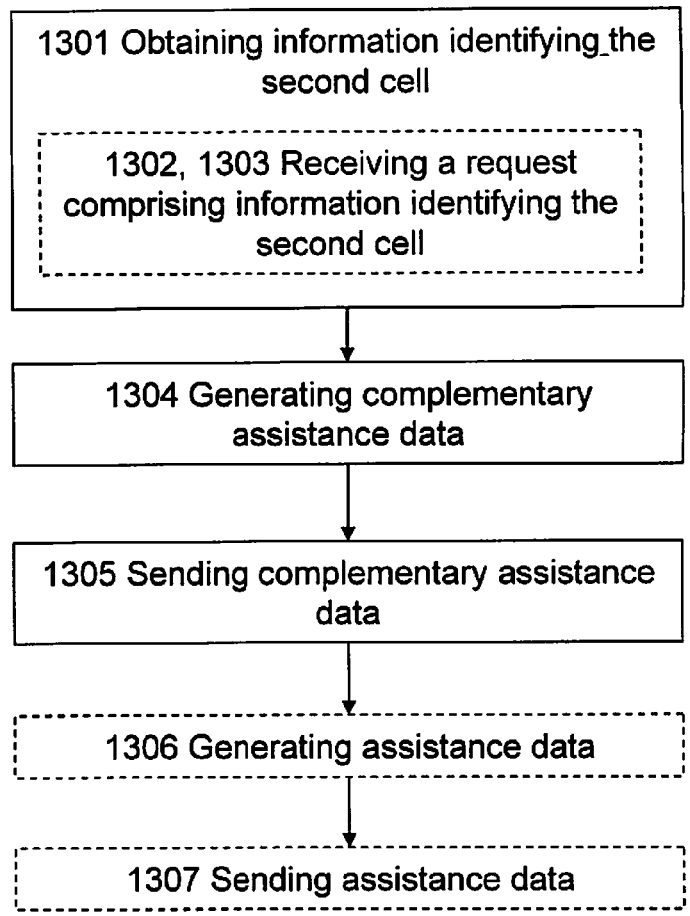
FIG. 13 shows a schematic flow chart of the methods of FIG. 2 when seen from the positioning node.

In FIG. 13, an exemplifying, schematic flow chart of the methods of FIG. 2 when seen from the positioning node 110 is shown. The positioning node 110 may perform methods for providing complementary assistance data to be used by the user equipment 120 during the positioning session for determining the position of the user equipment 120.

The following actions, such as steps, may be performed.
Action 1302
This action corresponds to action 202.
In some embodiments, the radio network node 130 sends and the positioning node 110 receives, a request for complementary assistance data relating to the user equipment 120.
Action 1303
This action corresponds to action 203.
In some embodiments, the user equipment 120 sends and the positioning node 110 receives a request for complementary assistance data.
It is preferred that one of action 1302 and action 1303 is performed.
Action 1301
This action corresponds to action 201.
The positioning node 110 obtains information identifying the second cell for which complementary assistance data is to be generated.
In some embodiments, the information identifying the second cell comprises information about a cell identity of the second cell.
In some embodiments, the obtaining comprises receiving 202, 203 the information identifying the second cell from a radio network node 130 or the user equipment 120.

In some embodiments, the information identifying the second cell is comprised in a request for complementary assistance data. The request may be received from the user equipment 120 or the radio network node 130. See action 202 and/or 203 above.
Action 1304
This action corresponds to action 204.
The positioning node 110 generates the complementary assistance data relating to at least the second cell, the complementary assistance data comprises assistance data adapted to the second cell when the second cell is configured to provide control information to the user equipment 120.
Action 1305
This action corresponds to action 205.
The positioning node 110 sends and the radio network node 130 receives complementary assistance data. The complementary assistance data may be sent to the user equipment 120 via the radio network node 130.
Action 1306
This action corresponds to action 207.
In some embodiments, the positioning node 110 generates assistance data pertaining to the cell serving the user equipment 120 before the change.
Action 1307
This action corresponds to action 208.
In some embodiments, the positioning node 110 sends the generated assistance data to the user equipment via the radio network node 130. Thus, the user equipment 120 receives the generated assistance data.

Figure 14:
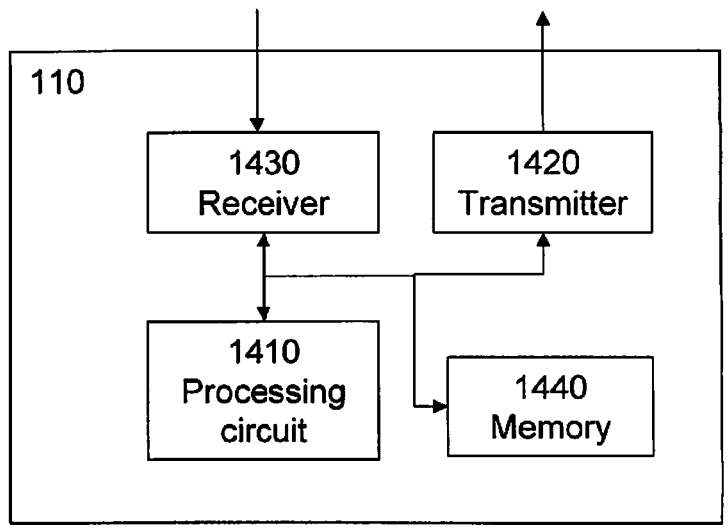
FIG. 14 shows a schematic block diagram of an exemplifying positioning node configured to perform the methods illustrated in FIG. 13.

Turning to FIG. 14, a schematic block diagram of the exemplifying positioning node 110 is shown. The positioning node 110 is configured to perform the methods illustrated in FIG. 13, i.e. the positioning node 110 is configured to provide complementary assistance data to be used by the user equipment 120 during the positioning session for determining a position of the user equipment 120. The user equipment 120 is configured to be served by the first cell and is configured to receive control information from the first cell before the change from the first cell to the second cell. The change occurs during the positioning session. The user equipment 120 is configured to be served by the second cell and is configured to receive control information from the second cell after the change.

In some embodiments of the positioning node 110, the positioning node 110 is an E-SMLC.

The positioning node 110 comprises a processing circuit 1410 configured to obtain information identifying the second cell for which complementary assistance data is to be generated. As an example, the complementary assistance data may assist the user equipment 120 when performing measurements when the second cell is configured to provide control information to the user equipment 120. As an example, the second cell is configured to provide control information to the user equipment 120 when the second cell is the serving cell, such as the primary serving cell. Furthermore, the processing circuit 1410 is configured to generate the complementary assistance data relating to at least the second cell. The complementary assistance data comprises assistance data adapted to the second cell when the second cell is configured to provide control information to the user equipment 120.

In some embodiments of the positioning node 110, the processing circuit 1410 further is configured to receive the information identifying the second cell from the radio network node 130 or the user equipment 120.

In some embodiments of the positioning node 110, the information identifying the second cell comprises information about a cell identity of the second cell.

In some embodiments of the positioning node 110, the information identifying the second cell is comprised in a request for complementary assistance data.

The processing circuit 1410 may be a processing unit, a processor, an application specific integrated circuit (ASIC), a field-programmable gate array (FPGA) or the like. As an example, a processor, an ASIC, an FPGA or the like may comprise one or more processor kernels.

The positioning node 110 further comprises a transmitter 1420 configured to send the complementary assistance data to the user equipment 120 in advance of the change. In this manner, the positioning node 110 is configured to provide the complementary assistance data. As an example, the complementary assistance data is provided, or sent, to the user equipment.

In some embodiments, the positioning node 110 may further comprise a receiver 1430 configured to receive the information identifying the second cell from the radio network node 130 or the user equipment 120.

In some embodiments, the positioning node 110 may further comprise a memory 1440 for storing software to be executed by, for example, the processing circuit. The software may comprise instructions to enable the processing circuit to perform the method in the radio network node 110 as described above in conjunction with FIG. 13. The memory 1440 may be a hard disk, a magnetic storage medium, a portable computer diskette or disc, flash memory, random access memory (RAM) or the like. Furthermore, the memory may be an internal register memory of the processing circuit.

Figure 15:
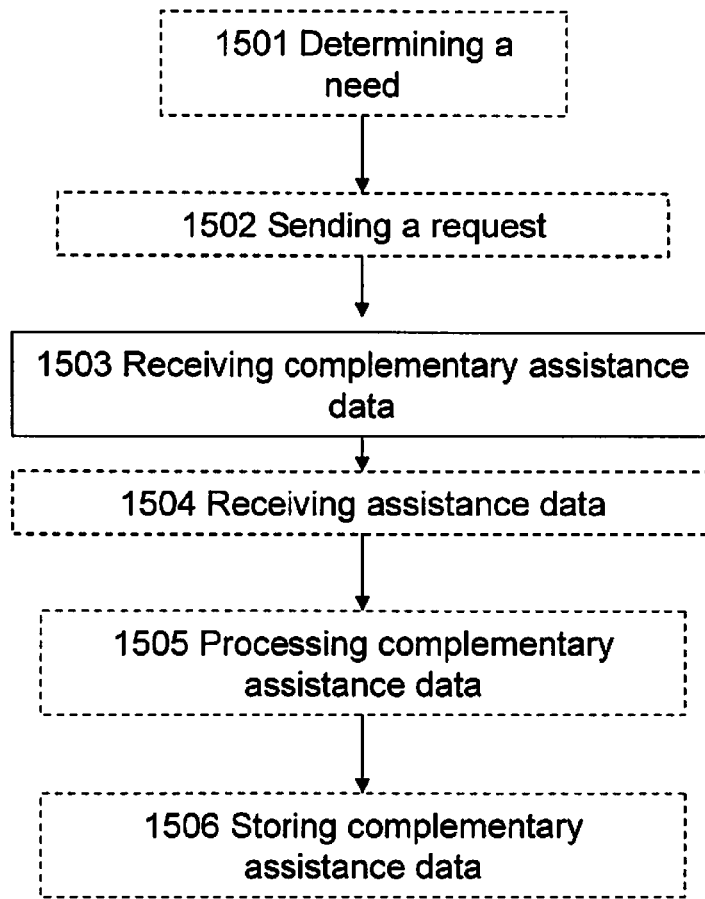
FIG. 15 shows a schematic flow chart of the methods of FIG. 2 when seen from the user equipment.

In FIG. 15, an exemplifying, schematic flow chart of the methods of FIG. 2 when seen from the user equipment 120 is shown. The user equipment 120 may perform methods for enabling continuation of a positioning session with a positioning node 110 serving the user equipment 120. A change from a first cell to a second cell occurs during the positioning session. The user equipment 120 is served by the first cell and is configured to receive control information from the first cell before the change. The user equipment 120 is served by the second cell and is configured to receive control information from the second cell after the change.

The following actions may be performed.

Action 1501

This action corresponds to action 211.

In some embodiments, the user equipment 120 determines a need for complementary assistance data.

In some embodiments, the need for complementary assistance data is determined by predicting that the change from the first cell to the second cell is to occur during the positioning session.

In some embodiments of the method, the determining is performed by predicting that the change from the first cell to the second cell is to occur during the positioning session.

In some embodiments of the method, the predicting of the change is performed by comparing a threshold value for a measurement to at least one of:
  a measured value for the measurement towards serving cell, and
  a measured value for the measurement towards a neighbor cell.

As an example, the measured value for the measurement towards the serving cell or the neighbor cell is Reference Signal Received Power (RSRP), Reference Signal Received Quality (RSRQ) or any other measure used for determining need for the change.

In some embodiments of the method, the predicting of the change is further performed based on at least one of the following criteria:
  Utilization of channel,
  Radio link monitoring performance of serving radio link,
  HARQ performance,
  RLC performance,
  Carrier aggregation type,
  Frequency band characteristics of the first carrier and/or second carrier, and the like.

Action 1502

This action corresponds to action 203.

In some embodiments, the user equipment 120 sends a request for complementary assistance data.

In some embodiments, the request is sent to the positioning node 110.

Action 1503

This action corresponds to action 206.

The radio network node 130 sends and the user equipment 120 receives the complementary assistance data relating to the second cell in advance of the change, thereby providing the complementary assistance data. The complementary assistance data comprises assistance data adapted to the second cell when the second cell is configured to provide control information to the user equipment 120. The complementary assistance data may be received via the radio network node 130.

In some embodiments, the complementary assistance data is received prior to a beginning of the positioning session.

Action 1504

This action corresponds to action 209.

In some embodiments, the radio network node 130 sends and the user equipment 120 receives the generated assistance data. The generated assistance data is received from the positioning node 110.

Action 1505

This action corresponds to action 212.

The user equipment 120 processes the complementary assistance data, thereby enabling continuation of the positioning session. The complementary assistance data is used by the user equipment 120 to configure positioning measurements performed during the positioning session.

As an example, the user equipment 120 processes the complementary assistance data, as well as the assistance data received in action 209, and uses results from said processing for configuring positioning measurements. Configuring positioning measurements according to the complementary assistance data and/or the assistance data may comprise e.g.:
  configuring measurement bandwidth for one or more cells,
  configuring the expected signal search window, i.e. the window centre and the window length,
  configuring measurement occasions in time e.g. aligned with PRS transmission occasions,
  accounting for PRS muting,
  creating measurement groups or cell groups,
  requesting measurement gap configuration compliant with the complementary assistance data.

In some embodiments, the complementary assistance data is processed during the positioning session.

Action 1506

This action corresponds to action 213.

In some embodiments, the user equipment 120 stores the complementary assistance data.

Figure 16:
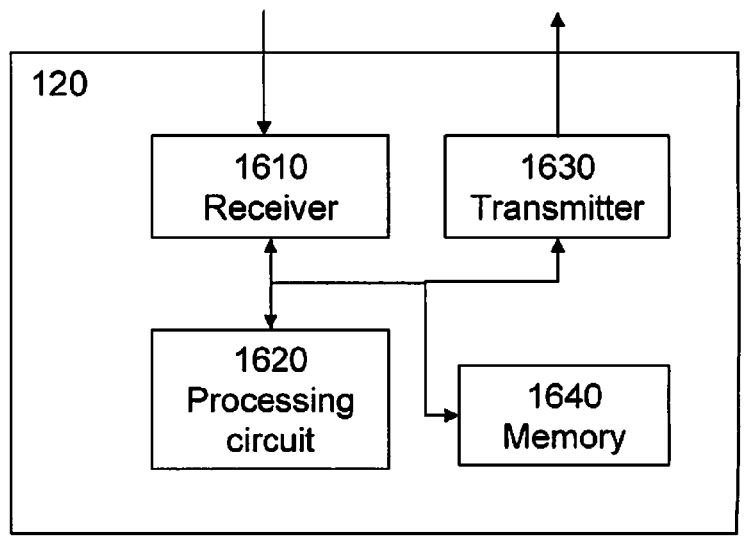
FIG. 16 shows a schematic block diagram of an exemplifying user equipment configured to perform the methods illustrated in FIG. 15.

Referring to FIG. 16, a schematic block diagram of the exemplifying user equipment 120 is shown. The user equipment 120 is configured to perform the methods illustrated in FIG. 15, i.e. the user equipment 120 is configured to enable continuation of a positioning session with a positioning node 110 configured to serve the user equipment 120. The user equipment 120 is configured to be served by the first cell before a change from a first cell to a second cell. The change occurs during the positioning session. The user equipment 120 is configured to receive control information from the first cell before the change. The user equipment 120 is configured to be served by the second cell and is configured to receive control information from the second cell after the change.

The user equipment 120 comprises a receiver 1610 configured to receive, from the positioning node 110, complementary assistance data in advance of the change. The complementary assistance data relates to the second cell and is adapted to the second cell when the second cell is configured to provide control information to the user equipment 120.

In some embodiments of the user equipment 120, the receiver 1610 further is configured to receive the complementary assistance data prior to a beginning of the positioning session.

The user equipment 120 comprises a processing circuit 1620 configured to process the complementary assistance data, thereby being configured to enable continuation of the positioning session.

In some embodiments of the user equipment 120, the processing circuit 1620 further is configured to determine comprising a need for complementary assistance data and to send a request for complementary assistance data.

In some embodiments of the user equipment 120, the processing circuit 1620 further is configured to predict that the change from the first cell to the second cell is to occur during the positioning session.

In some embodiments of the user equipment 120, the processing circuit 1620 further is configured to compare a threshold value for a measurement to at least one of:
 a measured value for the measurement towards serving cell, and
 a measured value for the measurement towards a neighbor cell.

In some embodiments of the user equipment 120, the predicting of the change is further performed based on at least one of the following criteria:
 Utilization of channel,
 Radio link monitoring performance of serving radio link,
 HARQ performance,
 RLC performance,
 Carrier aggregation type,
 Frequency band characteristics of the first carrier and/or second carrier, and the like.

In some embodiments of the user equipment 120, the processing circuit 1620 further is configured to process the complementary assistance data during the positioning session.

In some embodiments of the user equipment 120, the processing circuit 1620 further is configured to store the complementary assistance data.

The processing circuit 1620 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments, the user equipment 120 may further comprise a transmitter 1630 configured to send positioning information, such as a result of the positioning session, to the positioning node 110 via the radio network node 130.

In some embodiments, the user equipment 120 may further comprise a memory 1640 for storing software to be executed by, for example, the processing circuit. The software may comprise instructions to enable the processing circuit to perform the method in the user equipment 120 as described above in conjunction with FIG. 15. The memory 1640 may be a hard disk, a magnetic storage medium, a portable computer diskette or disc, flash memory, random access memory (RAM) or the like. Furthermore, the memory may be an internal register memory of the processing circuit.

Figure 17:
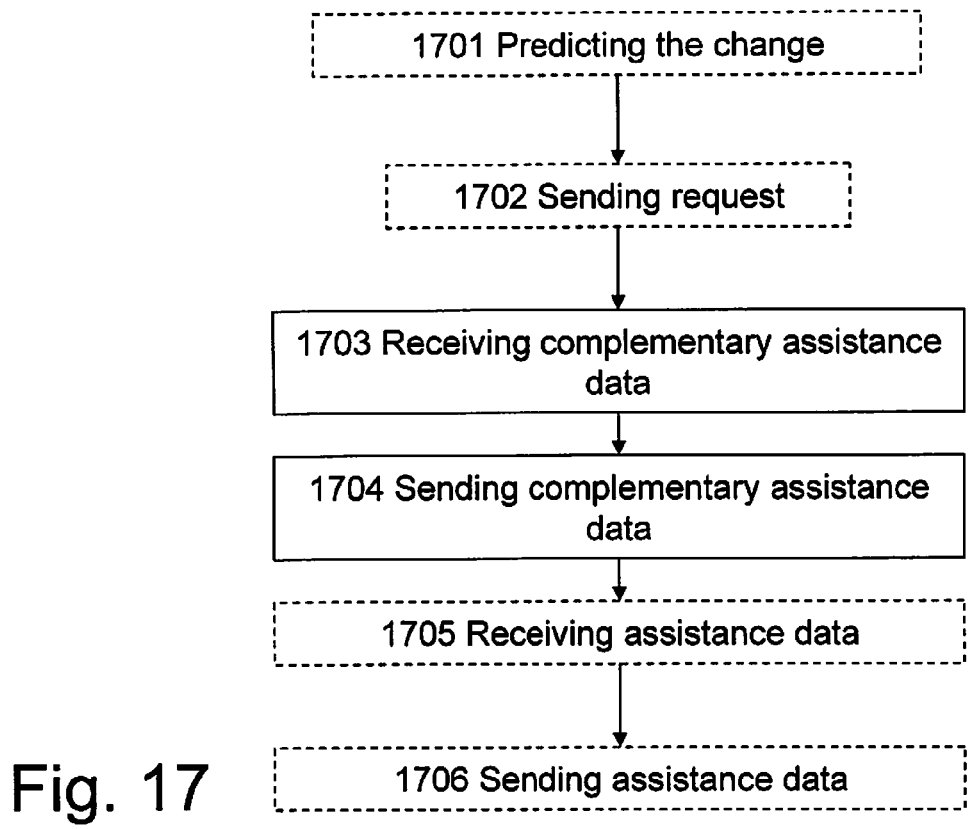
FIG. 17 shows a schematic flow chart of the methods of FIG. 2 when seen from the radio network node.

In FIG. 17, an exemplifying, schematic flow chart of the methods of FIG. 2 when seen from the radio network node 130 is shown. The radio network node 130 may perform methods for providing complementary assistance data to be used by a user equipment 120. The complementary assistance data is to be provided in advance of a change from a first cell to a second cell. The user equipment 120 is served by the first cell and is configured to receive control information from the first cell before the change. The change occurs during a positioning session. The user equipment 120 is served by the second cell and is configured to receive control information from the second cell after the change.

The following actions may be performed.

Action 1701

This action corresponds to action 210.

In some embodiments, the radio network node 130 predicts that the change from the first cell to the second cell is to occur during the positioning session.

In some embodiments of the method, the predicting of the change is performed by comparing a threshold value for a measurement to at least one of:
 a measured value for the measurement towards serving cell, and
 a measured value for the measurement towards a neighbor cell.

In some embodiments of the method, the predicting of the change is further performed based on at least one of the following criteria:
 Utilization of channel,
 Radio link monitoring performance of serving radio link,
 HARQ performance,
 RLC performance,
 Carrier aggregation type,
 Frequency band characteristics of the first carrier and/or second carrier, and the like.

Action 1702

This action corresponds to action 202.

In some embodiments, the radio network node 130 sends, to the positioning node, a request for complementary assistance data relating to the user equipment 120.

Action 1703

This action corresponds to action 205.

The positioning node 110 sends and the radio network node 130 receives complementary assistance data.

Action 1704

This action corresponds to action 206.

The radio network node 130 sends and the user equipment 120 receives the complementary assistance data relating to the second cell in advance of the change, thereby providing the complementary assistance data. The complementary assistance data comprises assistance data adapted to the second cell when the second cell is configured to provide control information to the user equipment 120.

In some embodiments, the complementary assistance data is received prior to a beginning of the positioning session.

A result of actions 1703 and 1704 is that the positioning node 110 sends the complementary assistance data to the user equipment 120 via the radio network node 130. In this manner, the positioning node 110 provides the complementary assistance data to the user equipment 120.

Action 1705

This action corresponds to action 208.

In some embodiments, the positioning node 110 sends the generated assistance data to the user equipment via the radio network node 130. Thus, the user equipment 120 receives the generated assistance data.

Action 1706

This action corresponds to action 209.

In some embodiments, the radio network node 130 sends and the user equipment 120 receives the generated assistance data. The generated assistance data is received from the positioning node 110.

Figure 18:
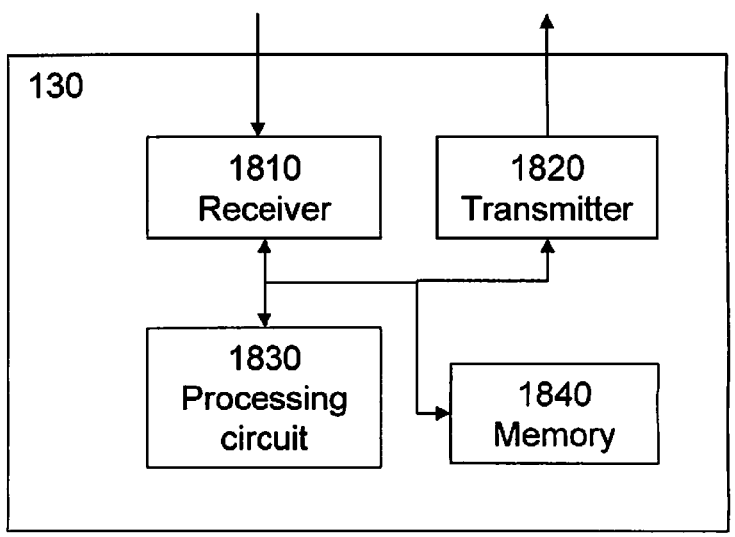
FIG. 18 shows a schematic block diagram of an exemplifying radio network node configured to perform the methods illustrated in FIG. 17.

In FIG. 18, a schematic block diagram of the exemplifying radio network node 130 is shown. The radio network node 130 is configured to perform the methods illustrated in FIG. 17, i.e. the radio network node 130 is configured to provide complementary assistance data to be used by a user equipment 120. The complementary assistance data is to be provided in advance of a change from a first cell to a second cell. The user equipment 120 is configured to be served by the first cell and is configured to receive control information from the first cell before the change. The change occurs during a positioning session. The user equipment 120 is configured to be served by the second cell and is configured to receive control information from the second cell after the change.

The radio network node 130 comprises a receiver 1810 configured to receive complementary assistance data.

The radio network node 130 comprises a transmitter 1820 configured to send the complementary assistance data relating to the second cell to the user equipment 120 in advance of the change, thereby being configured to provide the complementary assistance data.

In some embodiments, the transmitter 1820 further is configured to send, to the positioning node, a request for complementary assistance data relating to the user equipment 120.

In some embodiments of the radio network node 130, the radio network node 130 further comprises a processing circuit 1830 configured to predict that the change from the first cell to the second cell is to occur during the positioning session.

In some embodiments of the radio network node 130, the processing circuit 1830 further is configured to compare a threshold value for a measurement to at least one of:
  a measured value for the measurement towards serving cell, and
  a measured value for the measurement towards a neighbor cell.

In some embodiments of the radio network node 130, the predicting of the change is further performed based on at least one of the following criteria:
  Utilization of channel,
  Radio link monitoring performance of serving radio link,
  HARQ performance,
  RLC performance,
  Carrier aggregation type,
  Frequency band characteristics of the first carrier and/or second carrier, and the like.

The processing circuit 1830 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments, the radio network node 130 may further comprise a memory 1840 for storing software to be executed by, for example, the processing circuit. The software may comprise instructions to enable the processing circuit to perform the method in the radio network node 130 as described above in conjunction with FIG. 17. The memory 1840 may be a hard disk, a magnetic storage medium, a portable computer diskette or disc, flash memory, random access memory (RAM) or the like. Furthermore, the memory may be an internal register memory of the processing circuit.

The above-described embodiments are intended to be illustrative in all respects, rather than restrictive, of the present disclosure. All such variations and modifications are considered to be within the scope and spirit of the present disclosure. No element, act, or instruction used in the description of the present application should be construed as critical or essential unless explicitly described as such. Also, as used herein, the article "a" is intended to include one or more items.

The invention claimed is:

1. A method in a positioning node for providing complementary assistance data to be used by a user equipment during a positioning session for determining a position of the user equipment, wherein a change from a first cell to a second cell occurs during the positioning session, wherein the user equipment is served by the first cell and is configured to receive control information from the first cell before the change, wherein the user equipment is served by the second cell and is configured to receive control information from the second cell after the change, the method comprising:
  obtaining information identifying the second cell for which complementary assistance data is to be generated;
  generating the complementary assistance data relating to at least the second cell, wherein the complementary assistance data comprises assistance data adapted to the second cell when the second cell is configured to provide control information to the user equipment; and
  sending the complementary assistance data to the user equipment in advance of the change, thereby providing the complementary assistance data to be used by the user equipment during the positioning session for determining the position of the user equipment.

2. The method according to claim 1, wherein the information identifying the second cell comprises information about a cell identity of the second cell.

3. The method according to claim 1, wherein the obtaining comprises receiving the information identifying the second cell from a radio network node or the user equipment.

4. The method according to claim 3, wherein the information identifying the second cell is comprised in a request for complementary assistance data.

5. The method according to claim 1, wherein the first cell operates on a first carrier frequency and the second cell operates on a second carrier frequency.

6. The method according to claim 5, wherein the first and second carrier frequencies are the same carrier frequency.

7. The method according to claim 5, wherein the first carrier frequency is a first primary component carrier before the change and the second carrier frequency is a second primary component carrier after the change.

8. The method according to claim 5, wherein the first and second carrier frequencies belong to the same frequency band.

9. The method according to claim 5, wherein the first carrier frequency and second carrier frequency belong to a first frequency band and second frequency band, respectively.

10. The method according to claim 5, wherein the change from the first cell to the second cell is a handover from the first cell to the second cell.

11. The method according to claim 7, wherein the change from the first cell to the second cell is a primary component carrier change from the first cell to the second cell in a carrier aggregation system or a multi-carrier system.

12. The method according to claim 1, wherein the positioning node is an Enhanced Serving Mobile Location Center, E-SMLC.

13. A positioning node for providing complementary assistance data to be used by a user equipment during a positioning session for determining a position of the user equipment, wherein the user equipment is configured to be served by the first cell and is configured to receive control information from the first cell before a change from a first cell to a second cell, the change occurring during the positioning session, wherein the user equipment is configured to be served by the second cell and is configured to receive control information from the second cell after the change, the positioning node comprising:
 a processing circuit configured to obtain information identifying the second cell for which complementary assistance data is to be generated, the processing circuit further being configured to generate the complementary assistance data relating to at least the second cell, wherein the complementary assistance data comprises assistance data adapted to the second cell when the second cell is configured to provide control information to the user equipment, and
 a transmitter configured to send the complementary assistance data to the user equipment in advance of the change, thereby being configured to provide the complementary assistance data to be used by the user equipment during the positioning session for determining the position of the user equipment.

14. The positioning node according to claim 13, wherein the information identifying the second cell comprises information about a cell identity of the second cell.

15. The positioning node according to claim 13, wherein the processing circuit further is configured to receive the information identifying the second cell from a radio network node or the user equipment.

16. The positioning node according to claim 15, wherein the information identifying the second cell is comprised in a request for complementary assistance data.

17. The positioning node according to claim 13, wherein the first cell operates on a first carrier frequency and the second cell operates on a second carrier frequency.

18. The positioning node according to claim 17, wherein the first and second carrier frequencies are the same carrier frequency.

19. The positioning node according to claim 17, wherein the first carrier frequency is a first primary component carrier before the change and the second carrier frequency is a second primary component carrier after the change.

20. The positioning node according to claim 17, wherein the first and second carrier frequencies belong to the same frequency band.

21. The positioning node according to claim 17, wherein the first carrier frequency and second carrier frequency belong to a first frequency band and second frequency band respectively.

22. The positioning node according to claim 17, wherein the change from the first cell to the second cell is a handover from the first cell to the second cell.

23. The positioning node according to claim 19, wherein the change from the first cell to the second cell is a primary component carrier change from the first cell to the second cell in a carrier aggregation system or a multi-carrier system.

24. The positioning node according to claim 13, wherein the positioning node is an Enhanced Serving Mobile Location Center, E-SMLC.

25. A method in a user equipment for enabling continuation of a positioning session with a positioning node, serving the user equipment, wherein a change from a first cell to a second cell occurs during the positioning session, wherein the user equipment is served by the first cell and is configured to receive control information from the first cell before the change, wherein the user equipment is served by the second cell and is configured to receive control information from the second cell after the change, the method comprising:
 receiving, from the positioning node, complementary assistance data in advance of the change, wherein the complementary assistance data relates to the second cell, wherein the complementary assistance data comprises assistance data adapted to the second cell when the second cell is configured to provide control information to the user equipment; and
 processing the complementary assistance data, thereby enabling continuation of the positioning session, wherein the complementary assistance data is used by the user equipment to configure positioning measurements performed during the positioning session.

26. The method according to claim 25, wherein the configuring of positioning measurements comprises one or more of:
 configuring measurement bandwidth for at least the second cell,
 configuring the expected signal search window,
 configuring measurement occasions in time,
 accounting for positioning reference signals, PRS, muting,
 creating measurement groups or cell groups,
 requesting measurement gap configuration compliant with the complementary assistance data.

27. The method according to claim 25, further comprising:
 determining a need for complementary assistance data; and
 sending a request for complementary assistance data.

28. The method according to claim 27, wherein the determining is performed by predicting that the change from the first cell to the second cell is to occur during the positioning session.

29. The method according to claim 28, wherein the predicting of the change is performed by comparing a threshold value for a measurement to at least one of:
 a measured value for the measurement towards serving cell, and
 a measured value for the measurement towards a neighbor cell.

30. The method according to claim 29, wherein the measured value for the measurement towards the serving cell is Reference Signal Received Power, RSRP, or Reference Signal Received Quality, RSRQ, and/or wherein the measured value for the measurement towards the neighbor cell is RSRP or RSRQ.

31. The method according to claim 28, wherein the predicting of the change is further performed based on at least one of the following criteria:
 Utilization of channel,
 Radio link monitoring performance of serving radio link,
 Hybrid Automatic Repeat request, HARQ, performance,
 Radio Link Control, RLC, performance,
 Carrier aggregation type, and
 Frequency band characteristics of the first carrier and/or second carrier.

32. The method according to claim 25, wherein the receiving of the complementary assistance data is performed prior to a beginning of the positioning session, wherein the processing of the complementary assistance data is performed during the positioning session.

33. A user equipment for enabling continuation of a positioning session with a positioning node, configured to serve the user equipment, wherein the user equipment is configured to be served by the first cell before a change from a first cell to a second cell, the change occurring during the positioning session, the user equipment being configured to receive control information from the first cell before the change, wherein the user equipment is configured to be served by the second cell and is configured to receive control information from the second cell after the change, the user equipment comprising:

a receiver configured to receive, from the positioning node, complementary assistance data in advance of the change, wherein the complementary assistance data relates to the second cell, wherein the complementary assistance data comprises assistance data adapted to the second cell when the second cell is configured to provide control information to the user equipment, and a processing circuit configured to process the complementary assistance data, thereby being configured to enable continuation of the positioning session, wherein user equipment is configured to use the complementary assistance data for configuring positioning measurements performed during the positioning session.

34. The user equipment according to claim 33, wherein the processing circuit further is configured to determine comprising a need for complementary assistance data and to send a request for complementary assistance data.

35. The user equipment according to claim 34, wherein the processing circuit further is configured to predict that the change from the first cell to the second cell is to occur during the positioning session.

36. The user equipment according to claim 35, wherein processing circuit further is configured to compare a threshold value for a measurement to at least one of:
a measured value for the measurement towards serving cell, and
a measured value for the measurement towards a neighbor cell.

37. The user equipment according to claim 36, wherein the processing circuit further is configured to predict the change based on at least one of the following criteria:
Utilization of channel,
Radio link monitoring performance of serving radio link,
Hybrid Automatic Repeat request, HARQ, performance,
Radio Link Control, RLC, performance,
Carrier aggregation type, and
Frequency band characteristics of the first carrier and/or second carrier.

38. The user equipment according to claim 33, wherein the processing circuit further is configured to store the complementary assistance data.

39. The user equipment according to claim 33, wherein the receiver further is configured to receive the complementary assistance data prior to a beginning of the positioning session, wherein the processing circuit further is configured to process the complementary assistance data during the positioning session.

40. A method in a radio network node for providing complementary assistance data to be used by a user equipment, wherein the complementary assistance data is to be provided in advance of a change from a first cell to a second cell, wherein the user equipment is served by the first cell and is configured to receive control information from the first cell before the change, wherein the change occurs during a positioning session, wherein the user equipment is served by the second cell and is configured to receive control information from the second cell after the change, the method comprising:

receiving complementary assistance data; and
sending the complementary assistance data relating to the second cell to the user equipment in advance of the change, thereby providing the complementary assistance data.

41. The method according to claim 40, further comprising:
predicting that the change from the first cell to the second cell is to occur during the positioning session; and
sending, to the positioning node, a request for complementary assistance data relating to the user equipment.

42. The method according to claim 41, wherein the predicting of the change is performed by comparing a threshold value for a measurement to at least one of:
a measured value for the measurement towards serving cell, and
a measured value for the measurement towards a neighbor cell.

43. The method according to claim 42, wherein the predicting of the change is further performed based on at least one of the following criteria:
Utilization of channel,
Radio link monitoring performance of serving radio link,
Hybrid Automatic Repeat request, HARQ, performance,
Radio Link Control, RLC, performance,
Carrier aggregation type, and
Frequency band characteristics of the first carrier and/or second carrier.

44. A radio network node for providing complementary assistance data to be used by a user equipment, wherein the complementary assistance data is to be provided in advance of a change from a first cell to a second cell, wherein the user equipment is configured to be served by the first cell and is configured to receive control information from the first cell before the change, wherein the change occurs during a positioning session, wherein the user equipment is configured to be served by the second cell and is configured to receive control information from the second cell after the change, the radio network node comprising:

a receiver configured to receive complementary assistance data, and
a transmitter configured to send the complementary assistance data relating to the second cell to the user equipment in advance of the change, thereby being configured to provide the complementary assistance data.

45. The radio network node according to claim 44, further comprising:
a processing circuit configured to predict that the change from the first cell to the second cell is to occur during the positioning session, and wherein the transmitter further is configured to send, to the positioning node, a request for complementary assistance data relating to the user equipment.

46. The radio network node according to claim 45, wherein the processing circuit further is configured to compare a threshold value for a measurement to at least one of:
a measured value for the measurement towards serving cell, and
a measured value for the measurement towards a neighbor cell.

47. The radio network node according to claim 46, wherein the processing circuit further is configured to predict the change based on at least one of the following criteria:
Utilization of channel,
Radio link monitoring performance of serving radio link,
Hybrid Automatic Repeat request, HARQ, performance,
Radio Link Control, RLC, performance,
Carrier aggregation type, and
Frequency band characteristics of the first carrier and/or second carrier.

* * * * *